US009467337B2

(12) United States Patent
Kayargadde et al.

(10) Patent No.: US 9,467,337 B2
(45) Date of Patent: Oct. 11, 2016

(54) METHOD AND SYSTEM OF REGISTERING A USER DEVICE WITH A DYNAMI-CALLY SELF-OPTIMIZING COMMUNICATION NETWORK

(71) Applicant: Saankhya Labs Private Limited, Bengaluru (IN)

(72) Inventors: Vishwakumara Kayargadde, Bengaluru (IN); Parag Naik, Bengaluru (IN); Anindya Saha, Bengaluru (IN); Sunil Hosur Ramesh, Bengaluru (IN)

( * ) Notice: Subject to any disclaimer, the term of this patent is extended or adjusted under 35 U.S.C. 154(b) by 0 days.

(21) Appl. No.: 14/925,773

(22) Filed: Oct. 28, 2015

(65) Prior Publication Data

US 2016/0127985 A1 May 5, 2016

(30) Foreign Application Priority Data

Oct. 29, 2014 (IN) .......................... 5400/CHE/2014

(51) Int. Cl.
*H04W 4/00* (2009.01)
*H04L 12/24* (2006.01)
*H04L 12/26* (2006.01)
*H04W 36/00* (2009.01)
*H04W 36/16* (2009.01)
*H04W 36/38* (2009.01)
*H04W 48/18* (2009.01)

(52) U.S. Cl.
CPC ........... *H04L 41/0823* (2013.01); *H04L 43/08* (2013.01); *H04W 36/0016* (2013.01); *H04W 36/165* (2013.01); *H04W 36/38* (2013.01); *H04W 48/18* (2013.01)

(58) Field of Classification Search
CPC ............. H04L 41/0823; H04L 43/08; H04W 36/0016; H04W 36/165; H04W 36/38; H04W 48/18
USPC ........................................ 455/435.2, 436–454
See application file for complete search history.

(56) References Cited

U.S. PATENT DOCUMENTS

2014/0031006 A1* 1/2014 Moore ................. H04W 24/02
455/405
2016/0029253 A1* 1/2016 Sarkar ............... H04W 36/0016
455/436

* cited by examiner

*Primary Examiner* — Shahriar Behnamian
(74) *Attorney, Agent, or Firm* — The Law Office of Ausitn Bonderer, PC; Austin Bonderer

(57) ABSTRACT

Various methods and systems for establishing a connection between a user device and a base station (BS) in a dynamically self-optimizing communication network and methods and systems for handover of the user device from a first BS to a second BS is disclosed. In one embodiment, the method for establishing connection includes initializing user device, identifying a channel and a modulation scheme, receiving virtual machine (VM) primitives and registering by user device with the network based on the VM primitives. The method of handover includes generating by the first BS, a network implementation instruction for user device to adapt to second BS, downloading the network implementation instruction to user device to provide information regarding when to start executing the instruction, communicating by first BS to second BS an intimation regarding completion of handover of user device and informing second BS as to when to take over the user device.

18 Claims, 11 Drawing Sheets

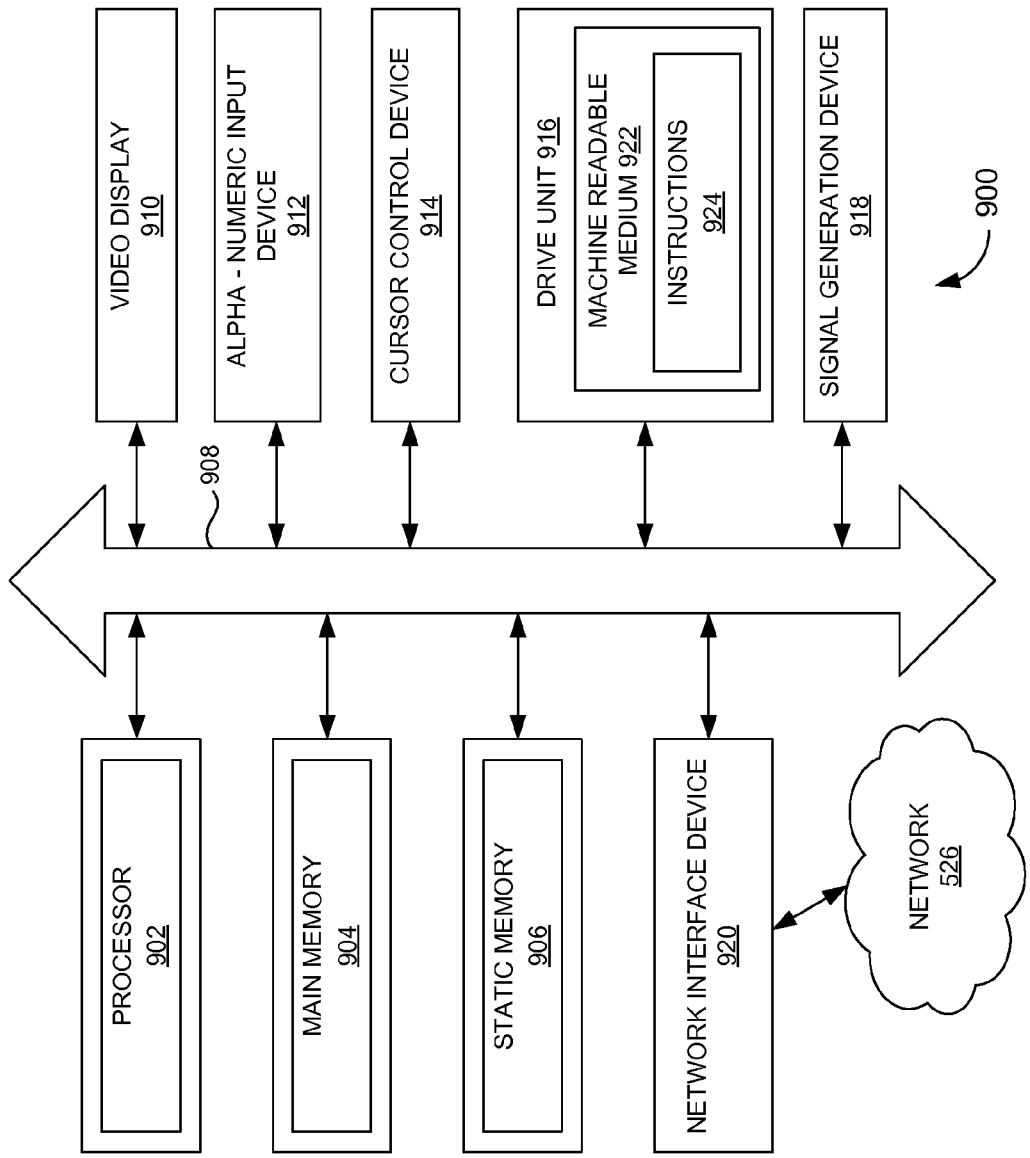

METHOD AND SYSTEM OF REGISTERING A USER DEVICE WITH A DYNAMI-CALLY SELF-OPTIMIZING COMMUNICATION NETWORK

CROSS-REFERENCE TO RELATED APPLICATIONS

This application claims priority to Indian patent application no. 5400/CHE/2014 filed on Oct. 29, 2014, the complete disclosure of which, in its entirely, is herein incorporated by reference.

BACKGROUND

1. Technical Field

The embodiments herein generally relate to communication networks, and more particularly, to system and method of registering a user device with a dynamically self-optimizing communication network.

2. Description of the Related Art

Pursuant to an exemplary scenario communication networks typically perform fixed and pre-defined operations that are determined either during manufacturing of communication devices configured to operate in the communication networks or during activation of the communication devices. Currently available communication networks provide little flexibility for adapting to dynamic changes in communication environment, available resources or system capability. Due to the fixed nature of the network, typically the communications networks often do not deliver an optimal performance in scenarios involving dynamic changes in the communication environment. Examples of dynamic changes may include but is not limited to, new spectrums released due to government policy changes or due to obsolesce of earlier technology using the spectrum, dynamic changes in noise and interference in the radio spectrum, and changes in efficiency of use of spectrum due to changes in channel noise and interference conditions, power levels, location of devices in the network and the like. In several exemplary scenarios self-organizing networks (SONs) may be used to adapt to the dynamic changes in communication environment. However, SONs only cater to fixed bands, fixed bandwidth, and fixed modulation schemes and do not provide a mechanism to dynamically optimize network performance for most efficient use of all available resources, such as spectrum.

SUMMARY

This Summary is provided to introduce a selection of concepts in a simplified form that are further described below in the Detailed Description. This Summary is not intended to identify key or essential features of the claimed subject matter, nor is it intended to be used as an aid in determining the scope of the claimed subject matter.

In one aspect, a method of establishing a connection between a user device and a base station in a dynamically self-optimizing communication network is disclosed. In one embodiment, the method includes initializing the user device modelled as a virtual machine. The method further includes identifying a channel and a modulation scheme by the user device based on one of a dynamic selection or a static allocation for downlink aligning with the base station. The method further includes receiving a set of virtual machine primitives for enabling the user device to register with the dynamically optimizing communication network from the base station. The set of virtual machine primitives comprises at least one of a modulation type and one or more modulation parameters to be used by the user device to communicate with the base station. The method furthermore includes registering by the user device with the dynamically self-optimizing communication network based on the received set of virtual machine primitives.

In another aspect, a method of handover of a user device from a first base station to a second base station in a dynamically self-optimizing communication network is provided. In an embodiment, the method includes informing to the user device by the first base station about the hand over and informing by the first base station to the second base station about the handover. The method also includes generating by the first base station, a network implementation instruction for the user device to adapt to the second base station. The method further includes downloading by the first base station, the network implementation instruction to the user device and providing information to the user device regarding when to start executing the network implementation instruction. The method furthermore includes communicating by the first base station to the second base station an intimation regarding completion of handover of the user device and informing the second base station as to when to take over the user device. The method furthermore includes transmitting a connection request by the user device to the second base station and receiving a connection confirmation from the second base station at the user device and completing the handover.

In yet another aspect, a user device modelled as a virtual machine is provided. The user device is configured to establish a connection with a base station in a dynamically self-optimizing communication network by initializing and identifying a channel and a modulation scheme based on one of a dynamic selection or a static allocation for downlink aligning with the base station of the dynamically self-optimizing communication network. The user device is configured to receive a set of virtual machine primitives from the base station to register with the dynamically optimizing communication network. The set of virtual machine primitives includes at least one of a modulation type and one or more modulation parameters to be used by the user device to communicate with the base station. The user device is also configured to register with the dynamically self-optimizing communication network based on the received set of virtual machine primitives.

In yet another aspect, a system in a dynamically self-optimizing communication network, for handover of a user device from a first base station to a second base station is disclosed. In an embodiment, the system includes a first base station, a second base station and a user device. The first base station is configured to inform to the user device about the hand over and inform to the second base station about the handover. The first base station is also configured to generate a network implementation instruction for the user device to adapt to the second base station. The first base station is also configured to download the network implementation instruction to the user device and provide information to the user device regarding when to start executing the network implementation instruction. The first base station is also configured to communicate to the second base station an intimation regarding completion of handover of the user device and informing the second base station as to when to take over the user device. The user device is configured to transmit a connection request to the second base station and receive a connection confirmation from the second base station and completing the handover. The second base station is configured to transmit the connection confirmation to the user device for completing the handover.

These and other aspects of the embodiments herein will be better appreciated and understood when considered in conjunction with the following description and the accompanying drawings. It should be understood, however, that the following descriptions, while indicating preferred embodiments and numerous specific details thereof, are given by way of illustration and not of limitation. Many changes and modifications may be made within the scope of the embodiments herein without departing from the spirit thereof, and the embodiments herein include all such modifications.

BRIEF DESCRIPTION OF THE DRAWINGS

The embodiments herein will be better understood from the following detailed description with reference to the drawings, in which:

FIG. 9 depicts a functional block diagram of an example general-purpose digital computing environment that may be used to implement various aspects of the present technology, in accordance with an embodiment.

DETAILED DESCRIPTION OF PREFERRED EMBODIMENTS

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. The examples used herein are intended merely to facilitate an understanding of ways in which the embodiments herein may be practiced and to further enable those of skill in the art to practice the embodiments herein. Accordingly, the examples should not be construed as limiting the scope of the embodiments herein.

Various embodiments disclosed herein provide methods and systems for establishing a connection between a user device and a base station in a dynamically self-optimizing communication network by registering the user device with the dynamically self-optimizing communication network and handing over the user device from one base station to another.

Figure 1:
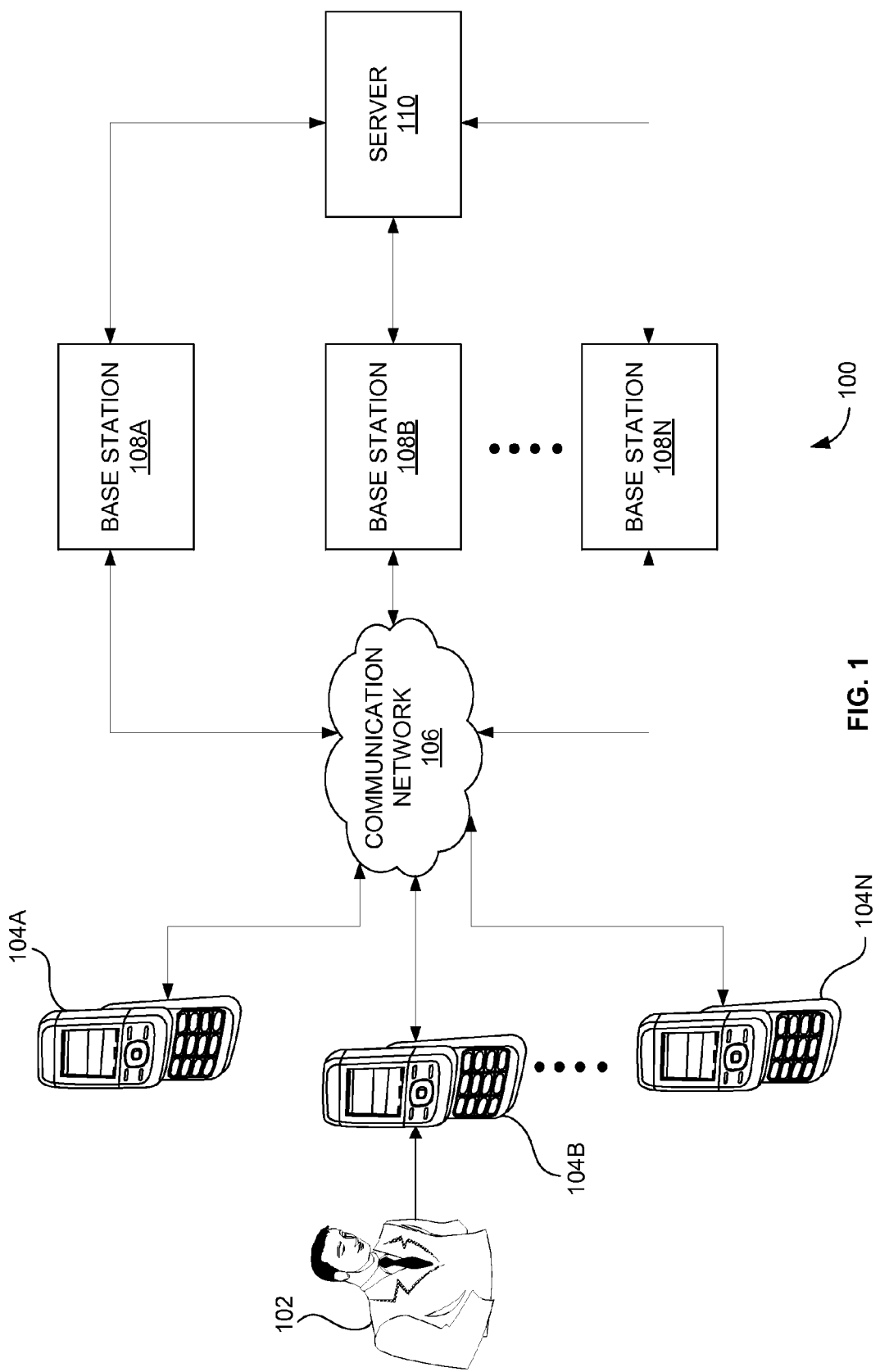
FIG. 1 illustrates a network environment of a dynamically self-optimizing communication network, in accordance with an embodiment.

FIG. 1 illustrates a network environment 100 of a dynamically self-optimizing communication network, in accordance with an embodiment. The network environment 100 includes a user 102, one or more user devices 104A-N, a dynamically self-optimizing communication network 106, (referred to herein after as the communication network 106), one or more base stations 108A-N, and the server 110. The one or more base stations 108A-N are communicatively associated with the server 110. The one or more user devices 104A-N are communicatively associated with the one or more base stations 108A-N through the communication network 106. It will be appreciated that the network connections shown are illustrative and other techniques for establishing a communications link between the computers can be used. The server 110 may include, but is not limited to a local server, a remote server, a server based on a cloud, and the like. An example of the one or more user devices 104A-N includes, but is not limited to a customer premises equipment, a personal computer (PC), a mobile communication device, a smart phone, a tablet PC, a laptop, a desktop, an ultra-book, a router, a network PC, a peer device, a network node, a modem, a dongle, any other network device capable of connecting to the communication network 106 for operational purposes.

In various embodiments, a compute infrastructure in one or more user devices 104A-N and/or one or more base stations 108A-N may range from a highly optimized hardware to a highly flexible cognitive radio platform capable of supporting wide range of radio frequencies and modulation schemes and dynamically switching between them in real-time. In various embodiments, the compute infrastructure of the one or more user devices 104A-N and/or the one or more base stations 108A-N may also comprise a virtual machine (VM) model supporting a set of primitives. The VM model may be capable of receiving a file containing one or more virtual machine primitives and generating one or more binary executable instructions. As used herein the term "VM" refers to a platform-independent execution environment that converts a byte-code into machine language instructions and executes the machine language instructions. The VM may be for example a Java Virtual Machine (JVM) or any other abstract computing machine defined by a specification, omitting an implementation and runtime details.

An example of the communication network 106 includes, but is not limited to an internet, intranet, a wide area network, a wired cable network, a broadcasting network, a wired communication network, a wireless communication network, a fixed wireless network, a mobile wireless network, and the like. The one or more user devices 104A-N interact with the one or more base stations 108A-N and the server 110 to establish an optimal network in a variable network environment. In an embodiment, one or more base stations 108A-N, server 110, and/or one or more user device 104A-N may be operable to perform a sequence of operations on different types of structured or unstructured data to derive required higher-level information, inferences and conclusions required for the optimal operation of the network (such as for example, Big data processing). In one embodiment, the one or more base stations 108A-N may be connected to centralized equipment which may in turn be connected to multiple other base stations. Either of the one or more user devices 104A-N and/or the one or more base stations 108A-N and/or the server 110 may constitute a network device of the present technology and may be operable to dynamically design and operate an optimal communication network configuration in the network environment 100.

Figure 2:
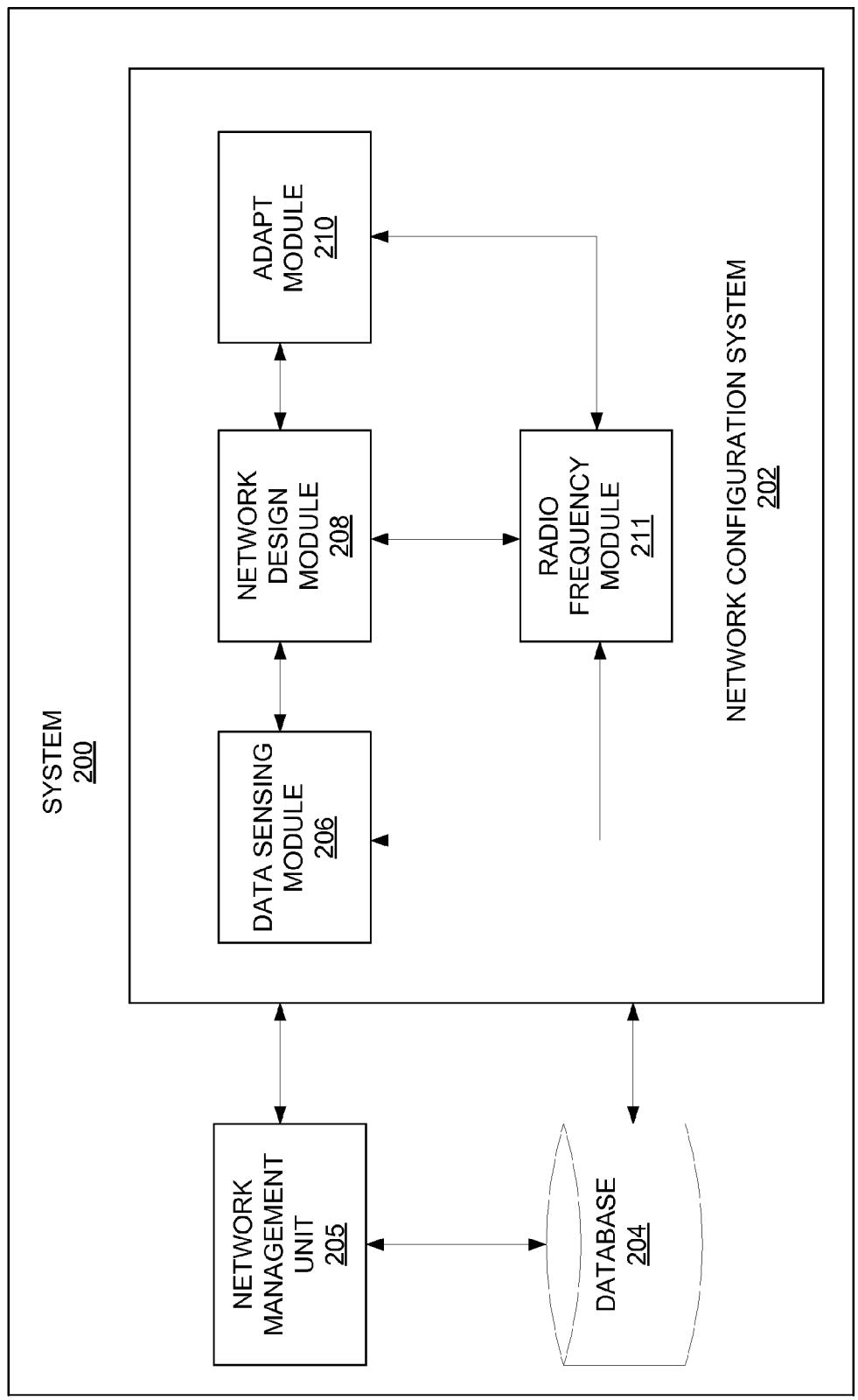
FIG. 2 exemplarily illustrates a block diagram of a network device in dynamically self-optimizing communication network, in accordance with an embodiment.

FIG. 2 exemplarily illustrates a block diagram of system 200 for dynamically self-optimizing communication network, in accordance with an embodiment. In an embodiment, the system 200 may be implemented in for example a user device from among the one or more user devices 104A-N, a base station (BS) from among the one or more BSs (108A-N) or a (such as server 110) deployed in the network environment 100 of FIG. 1. In an embodiment, the system 200 includes a network configuration system 202 communicatively associated with a database 204 and a network management unit 205. The network management unit 205 may be communicatively associated with the network configuration system 202 and/or the database 204. The network configuration system 202 is operable to dynamically design and operate an optimal communication network. In an embodiment, the network configuration system 202 is implemented in a user device (such as user device 104A of FIG. 1), a base station (such as base station 108A of FIG. 1), a server (such as server 110 of FIG. 1), or any combination thereof. In an embodiment, network configuration system 202 includes one or more modules such as a data sensing module 206, a network design module 208, an adapt module 210, and a radio frequency module 211. The network management unit 205 may be implemented either in a base station, a user device or a server. The network management unit 205 may be operable to manage the functionalities of various modules associated with the network configuration system 202.

Although the present embodiments have been described with reference to specific example embodiments, it will be evident that various modifications and changes may be made to these embodiments without departing from the broader spirit and scope of the various embodiments, for example, the various modules, such as the data sensing module 206, the network design module 208, the adapt module 210, and the radio frequency module 211 described herein may be enabled and operated using a firmware, software and/or hardware circuitry (e.g., CMOS based logic circuitry) or any combination of hardware, firmware, and/or software (e.g., embodied in a machine readable medium). Also various network devices and methods disclosed herein may be embodied using transistors, logic gates, and electrical circuits (e.g., Application Specific Integrated (ASIC) Circuitry and/or in Digital Signal Processor (DSP) circuitry). In an embodiment, one or more of the data sensing module 206, the network design module 208, the adapt module 210, radio frequency module 211 and/or the associated functionalities may be fully or partly implemented in one or more BSs 108A-N, the server 110, one or more user devices 104A-N or any combination thereof. For example, in an embodiment, the data sensing module 206 is fully or partly implemented in a BS form among the BSs 108A-N and/or a user device from among the user devices 104A-N. In an embodiment, the network design module 208 may be implemented in the server 110. In an embodiment, the adapt module 210 may be fully or partly implemented in a BS form among the BSs 108A-N and/or a user device from among the user devices 104A-N. Also various modules such as data sensing module 206, the network design module 208, radio frequency module 211, and the adapt module 210 described herein and their associated functionalities may be distributed across network devices belonging to different communication networks.

In an embodiment, the data sensing module 206 may be operable to gather a pre-saved data associated with a communication network and/or one or more network devices from a database and/or a real-time data associated with the communication network and/or one or more network devices. In an embodiment, the data sensing module 206 may be deployed on the server 110, one or more base stations 108A-N, and/or one or more user devices 104A-N. In an embodiment, the real-time data is gathered by sensing the communication network 106 and/or one or more network devices. In an embodiment, the data sensing module 206 may sense the real-time data based on for example, e.g., a spectrum sensing. The data sensing module 206 may be enabled to include functionalities of a camera, a microphone, a temperature sensor, a pressure sensor, a gyro, acceleration or wind speed sensor, and the like. In an embodiment, the real-time data may be gathered by sensing the radio frequency environment and the network environment 100. The real-time data may be gathered by the data sensing module 206 over an initial-handshake channel with one or more user devices 104A-N. A used herein the term "initial-handshake" refers to a channel used by the user device to initially join the network before the optimization process begins. This may be known to the user device because of prior settings or discovered by listening to one or more default channels. The default channels may be provided in a user device memory or a subscriber information module.

In an embodiment, the pre-saved data and/or the real-time data may include, for example a structured data and/or an unstructured data. The database 204 includes for example, an organized database and an unorganized database. The database 204 may be located/implemented in a user device (such as one or more user device 104A-N), in a base station (such as one or more BSs 108A-N), in a server (such as server 110), in a networked remote database, or on a cloud. The pre-saved data and/or the real-time data may include for example, big data and the big data may be gathered via big data analysis. The data sensing module 206 may perform a sequence of operations on the big data to derive higher-level information, inferences and conclusions required for the optimal operation of network. In an embodiment, the pre-saved data may include cloud data gathered from database including a storage database based on cloud computing. In an embodiment, the real-time data and/or the pre-saved data may include data associated with one or more capabilities of the network devices of the network environment 100, one or more user preferences, and/or one or more network operator preferences.

Examples of the pre-saved data may include, but is not limited to one or more radio frequency (RF) related parameters (such as RF band center frequency, a bandwidth, nature of a band (such as licensed/unlicensed) a maximum transmitter power permitted in the band), one or more baseband related parameters (such as, a channel quality information from previous day/week/month/year/average such as a signal to noise ratio (SNR), a carrier to noise ratio (CNR), an adjacent channel interference (ACI), a co-channel interference (CCI), impulse noise, details for ACI (out of band or far-off band), an implementation margin required), a media access control (MAC) related parameters (such as a maximum number of users to be supported in the communication network, a connectivity to centralized data base or only to local database), one or more network and/or user preference data (such as, data required optimize network for bits per hertz (Hz), latency or bits per Watt, reliability/graceful degradation or data security or in a combination of many in certain priority, a quality of service (OoS)/service level agreement (SLA) requirements if any, a degree of security needed in communication physical layer or higher layer, a maximum bit error rate, packet error rate or frame error rate allowable for an application), past performance data and/or other miscellaneous parameters (such as application details like nature of information sent that could be voice, video, data or a combination of those, a maximum propagation distance, terrain conditions, initial hand-shake communication channel and modulation details)

Examples of the real-time data may include, but is not limited to one or more RF related parameters (such as spectrum sensing in-band and adjacent bands an adjacent channel interference (ACI), in-band interference like level, nature (impulse/burst characteristics), out of band interference, far-off band interference, maximum distance from BS to user devices), one or more baseband related parameters (such as a co-channel interference (CCI), multi-path profile, fading profiles, and doppler), one or more MAC related parameters (such as maximum number of active users in the communication network), one or more miscellaneous parameters (such as ambient temperature), data associated with one or more capabilities of one or more base stations 108A-N and one or more user devices 104A-N in the network 106, a run time specifications, and the like.

The pre-saved data or the real-time data may also include data associated with capability of devices in the network, including but not limited to, RF related parameters (such as, a number of transmitter antennas at the base station, a number of receiver antennas at the base station, a number of transmitter antennas at the user device, a number of receiver antennas at the customer premise equipment, base station multiple input multiple output (MIMO)/multiple input single output (MISO)/single input multiple output (SIMO), or single input single output (SISO) configuration support, customer premise equipment MIMO/MISO/SIMO/SISO configuration support, base station radio frequency (RF) transmitter characteristics, base station radio frequency receiver characteristics, typical customer premise equipment RF transmitter characteristics, typical customer premise equipment RF receiver characteristics, maximum BS RF power possible, maximum customer premise equipment RF power possible, base station noise figure, typical customer premise equipment noise figure, base station third order intercept point (IP3), typical customer premise equipment IP3, base station/customer premise equipment duplexer support, base station/customer premise equipment diplexer support, base station/customer premise equipment carrier aggregation support (contiguous, non-contiguous), base station/customer premise equipment time division duplexing (TDD)/frequency division duplexing (FDD) support, one or more baseband related parameters (such as digital signal processor-virtual Machine (DSPVM) capability (maximum MAC support, List of DSP primitives supported (maximum fast fourier transform (FFT) etc)), one or more MAC related information (such as maximum compute cycles supported for MAC, maximum memory supported for MAC), and other parameters associated with the capability of the devices in the network.

The radio frequency module 211 is operable to enable radio frequency transmission and/or reception functionalities of the network configuration system 202. In an embodiment, the network design module 208 is operable to select one or more network optimization parameters based on the gathered data for designing an optimal network configuration. As used herein the term "network optimization parameters" refers to one or more parameters associated with the communication network and/or network devices associated with the communication network that may be selected so as to optimize performance of the communication network. In an embodiment, the network optimization parameters may be selected so as to be optimized relative to one or more other network optimization parameters. For example, the network design module 208 may select the network optimization parameters with an aim to optimize one network optimization parameters while keeping a minimum or a maximum target value for one or more other network optimization parameters. The minimum or maximum target value is a "constraint" for optimization, for example target value of a network optimization parameter may include a bit error rate of $10e^{-4}$. So bits per hertz may be optimized while maintaining a maximum bit error rate of $10e^{-4}$.

In an embodiment, the network design module 208 may be deployed on the server 110, one or more base stations 108A-N, and/or one or more user devices 104A-N. In an embodiment, the one or more network optimization parameters may include one or more performance parameters such as bit error rate, reliability (uptime), throughput or data rate, latency, security, and other user defined criteria.

In an embodiment, the network design module 208 designs the optimal network configuration by selecting various network parameters and/or by designing network schemes. Examples of the network parameters may include, but is not limited to, selection of a radio frequency channel, a modulation/demodulation scheme, multi-access scheme, a MAC scheme, and the like. Examples of network schemes may include, but not limited to, a modulation/demodulation scheme, multi-access scheme, a MAC scheme, and the like. In an embodiment, the network schemes designed may be custom or scenario specific scheme and different from existing, standard or popular schemes. In an embodiment, the network design may be performed by using one or more rules of performance-of-operation of communication networks and by applying certain optimization techniques. In an embodiment, the network optimization may be performed based on a cost function. In an embodiment, the network design module 208 selects at least one radio frequency channel based on the gathered data for enabling optimal network performance based on the selected one or more network optimization parameters. The network design module 208 may also select or design a modulation scheme and/or a demodulation scheme based on the gathered data for enabling optimal network performance based on the selected one or more network optimization parameters. Additionally, the network design module 208 may select or design a media access control (MAC) scheme based on the gathered data to ensure optimal network performance based on the selected one or more network optimization parameters.

The network design module 208 designs the optimal network configuration to optimize the selected one or more network optimization parameters, and generates one or more network implementation instructions to implement the designed optimal network configuration for the one or more network devices. The network implementation instructions may include, but is not limited to one or more executable instructions (for example, a computer executable code), one or more configuration files, one or more files containing virtual machine primitives, one or more binary executable instructions and/or any combination thereof.

In an embodiment, the network design module 208 residing on the server 110 generates network implementation instructions for optimal network configuration for both BS and user device. In another embodiment, the network design module 208 residing on the BS or the user device generates the network implementation instructions for the BS and/or one or more user devices in the communication network 106. In an embodiment, the network design module 208 generates network implementation instructions including a PHY code for PHY configuration and/or a MAC code for MAC configuration. As used herein the term "PHY code" refers to network implementation instructions for the physical layer and the term "MAC code" refers to network implementation instructions for the MAC layer. The MAC code may be generated automatically based on one or more parameters associated with a MAC configuration and the PHY code may be automatically generated based on one or more PHY parameters. In an embodiment, the MAC code and the PHY code may be generated for all the user devices and the BSs in the communication network 106.

In an embodiment, the adapt module 210 is operable to adapt at least one network device of a communication network to operate in compliance with the designed optimal network configuration based on the generated one or more network implementation instructions. In an embodiment, in order to adapt at least one network device of the communication network to operate in compliance with the designed optimal network configuration, the adapt module 210 provides the network implementation instructions via the communication network from one or more network devices to one or more other network devices. In an embodiment, the network implementation instructions may be transmitted (for example, downloaded) via the communication network from one or more network devices to one or more other network devices. For example, the network implementation instructions comprising binary executable instructions generated at the server 110 for the base stations may be transmitted from the server 110 to the one or more BSs 108A-N.

Similarly, the network implementation instructions comprising for example, binary executable instructions for user devices may be transmitted from one or more BSs 108A-N to one or more user devices 104A-N. In an embodiment, the network implementation instructions (comprising for example, a code) may be generated at one or more BSs 108A-N and a user device code component of the generated network implementation instruction may be transmitted from one or more BSs 108A-N to one or more user devices 104A-N. In another embodiment, the adapt module 210 is operable to transmit the one or more network implementation instructions from the one or more user devices 104A-N to another one or more user devices 104A-N, upon the network implementation instruction being generated in the one or more user devices 104A-N in an ad-hoc network.

In an instance where one or more BSs 108A-N and/or one or more user devices 104A-N support a VM model supporting a set of primitives, network implementation instructions including one or more configuration files or one or more virtual machine primitives may be generated for one or more BSs 108A-N and/or one or more user device 104A-N. Upon the network implementation instructions (including configuration files or virtual machine primitives) being generated at server 110, the configuration files or virtual machine primitives may be transmitted to one or more BSs 108A-N, and, subsequently from the BSs 108A-N to one or more user devices 104A-N that may be configured to generate one or more binary executable instructions from the configuration files or the virtual machine primitives. Upon the network implementation instructions (including configuration files or virtual machine primitives) being generated at one or more BSs 108A-N, the configuration files or virtual machine primitives may be transmitted to one or more user devices 104A-N that may be configured to generate one or more binary executable instructions from the configuration files or the virtual machine primitives. Similarly, upon the network implementation instructions (including configuration files or virtual machine primitives) being generated at one or more user devices 104A-N, the one or more user devices 104A-N may be configured to generate one or more binary executable instructions from the configuration files or the virtual machine primitives. In an ad-hoc network, the network implementation instructions including configuration files or virtual machine primitives generated at user devices 104A-N may be transmitted to one or more other user devices 104A-N that may be configured to generate one or more binary executable instructions from the configuration files or the virtual machine primitives.

In an embodiment, the configuration files or the virtual machine primitives may include, for example, an optimum parameters set, a device capability of one or more user devices 104A-N and/or one or more BSs 108A-N, or a run time specification, and the like. The optimum parameters set may be for example, derived by the network design module 208 during designing the optimal network configuration. In an embodiment, the optimum parameter set may be derived by optimizing a cost function consisting of various parameters.

The device capability may provide one or more constraints on generating the network implementation instruction (for example, code) capable of being executed on a network device. In an embodiment, the generation of the network implementation instruction by a Server or BS for the user device requires the Server or BS to be aware of one or more device capabilities of the user device, such as for example, a processing power on the PHY/MAC, single/multi core processor, a memory configuration, and the like. For example, if the network optimization parameters for a downlink includes a security information using a Kasumi encryption, a schedule for MAC-round robin, a frame structure for MAC, a transmission time interval (TTI) duration (for example 5 milliseconds), an acknowledgement at MAC, a handover capability, an inter-radio access technology (RAT) capability, a user device may be configured to design an optimal network configuration for a receiver based on the above network optimization parameters, and the configuration file including a run-time specification based on the above listed network optimization parameters may be as given below:

```
message structure
struct _message {
    BYTE message_plane
    BYTE message_type
    BYTE forward_timeout
```

```
    BYTE forward_priority
    UINT payload_size
    ULONG *message_payload
}
MESSAGE_QUEUE {
  queues = 3 /* Total number of message queues */
  ASSOCIATION {
    APP = CG , /* App interface to CG */
    SYNCHRONOUS,
    0, /* 10ms read timeout */
    10, /* 10ms write timeout , global configuration , should be possible to over-
    ride based on <channel
    type : timeout> mapping*/
    5 , /* number of messages in queue */
    0 /* run-time creation of message queue 0 = NOT SUPPORTED , 1 = SUP-
    PORTED */
  }
  ASSOCIATION {
    MAC = CG , /* MAC interface to Common Gateway */
    SYNCHRONOUS,
    0, /* 10ms read timeout */
    10, /* 10ms write timeout , global configuration , should be possible to over-
    ride based on <channel
    type : timeout> mapping*/
    5 , /* number of messages in queue */
    0 /* run-time creation of message queue 0 = NOT SUPPORTED , 1 = SUP-
    PORTED */
  }
ASSOCIATION {
    CG = ALL, /* Common Gateway interface to all threads*/
    SYNCHRONOUS,
    0, /* 10ms read timeout */
    10, /* 10ms write timeout , global configuration , should be possible to over-
    ride based on <channel
    type : timeout> mapping*/
    5 , /* number of messages in queue */
    0 /* run-time creation of message queue 0 = NOT SUPPORTED , 1 = SUP-
    PORTED */
  }
}
MESSAGE_PAYLOAD {
  ALLOC = MAC /* MAC to allocate memory for payload */
  DEALLOC = MAC /* MAC to deallocate memory for payload */
  ALLOC_TYPE = STACK_INTERNAL
}
THREAD {
  THREADS = 8
  ASSOCIATION {
    NAS_Thread , /* thread name */
    10 , /* low priority */
    MODULE, /* scope */
    NONE /* critical region locking */ ,
    STATIC , /* STATIC - created during initialization or DYNAMIC - created
    and deleted dynamically */
    ASSOC_INFO {
      initNAS /* procedure name */
    }
  }
  ASSOCIATION {
    CG_Thread , /* thread name */
    5 , /* high priority */
    MODULE , /* scope */
    NONE /* critical region locking */
    STATIC,
    ASSOC_INFO {
      /* no procedures are implemented in dispatcher thread */
    }
  }
  ....
}
```

If the network implementation instruction is generated for a user device on the server or BS, additional information on the device capability that may be required to generate the network implementation instruction based on the above configuration file may be as below:

```
CPU {
    DualCore , /* CPU type */
    CPU_1_ASSOC {
    PROCEDURE_1 ,
    CG_Thread ,
    ....
    }
    CPU_2_ASSOC {
    PROCEDURE_2 ,
    MAC_Control_Thread ,
    MAC_Uplink_Thread ,
    ....
    }
}
MEMORY {
    TCM {
        TYPE_A , /* memory sub-type */
        True , /* memory manager support for data */
        True , /* memory manager suport for instructions */
        REGIONS {
            0X07FFFFFF – 0X07FFFF00, /* dummy values */
            NON-CACHEABLE
            ....
        }
        PROC_ASSOC {/* code association */
            interrupt_handler ,
            ....
        }
        DATA_ASSOC {/* data association */
            interrupt_vector_table : byte , /* data : alignment */
            ....
        }
    }
    TCM {
        TYPE_B , /* enum to identify the memory table */
        True , /* memory manager support for data */
        True , /* memory manager suport for instructions */
        REGIONS {
            0X07FFFF00 – 0X07FFFEBC, /* dummy values */
            NON-CACHEABLE
            ....
        }
        PROC_ASSOC {/* code association */
            L1_handler ,
            ....
        }
        DATA_ASSOC {/* data association */
            frequency_static_vector : byte , /* data : alignment */
            ....
        }
    }
    EXT_MEM {
        TYPE_C , /* enum to identify the memory table */
        True , /* memory manager support for data */
        True , /* memory manager suport for instructions */
        REGIONS {
            0X07FF0000– 0X07FFFFA0, /* dummy values */
            CACHEABLE
            ....
        }
        PROC_ASSOC {/* code association */
            SegmentationAlgo ,
            ....
        }
        DATA_ASSOC {/* data association */
            SegmentationConfig : byte , /* data : alignment */
            ....
        }
    }
}
```

Based on above set of information, the server or BS may generate network implementation instructions that may be executed on a specific platform in the user device supporting a virtual machine model.

In an embodiment, the adapt module 210 implements the provided optimal network configuration in the one or more other network devices. In an embodiment, the adapt module 210 implements the optimal network configuration in one or more network devices by executing the one or more network implementation instructions in the one or more network devices. For example, upon one or more network implementation instructions being transmitted from the server 110 to a BS, the adapt module 210 may cause the transmitted one or more network implementation instructions to be executed at the BS. Similarly, upon the one or more network implementation instructions being transmitted from the BS to a user device, the adapt module 210 may cause the one or more network implementation instructions to be executed at the user device. In an embodiment, subsequent to implementing the optimal network configuration, the adapt module 210 updates the database with the gathered data and the optimal network configuration for subsequent use.

In an embodiment, the operations of the data sensing module 206, the network design module 208, and the adapt module 210 may be triggered and repeated upon a criterion being fulfilled. In another embodiment, the operations of the data sensing module 206, the network design module 208, and the adapt module 210 may be triggered and repeated upon a plurality of criteria being fulfilled. In an embodiment, the criterion/plurality of criteria may be based on operation of the data sensing module 206 and/or the network design module 208. The criterion/plurality of criteria may include, for example one or more of (a) time based/periodic update such as lapse of certain time from a previous update, (b) environmental changes, such as when certain sensed parameter changes beyond certain percentage from a previously observed value (For example, SNR of a radio channel), (c) performance change, such as when measured performance falls below certain percentage of a previously observed performance (For example, a channel throughput), and (d) any other user defined/administrator defined event.

In various embodiment, the network configuration system 202 may additionally include other components (not shown), such as, for example, an input unit (e.g., a video processing device), a video display unit (e.g., a liquid crystals display (LCD), a cathode ray tube (CRT), and the like), a cursor control device (e.g., a mouse), a drive unit (e.g., a disk drive), a signal generation unit (e.g., a speaker) and/or a network interface unit. The drive unit includes a machine-readable medium upon which are stored one or more sets of instructions (e.g., software) embodying one or more of the methodologies and/or functions described herein. In an embodiment, the software resides, either completely or partially, within the data sensing module 206, the network design module 208, and the adapt module 210 also constitute machine-readable media. The software may further be transmitted and/or received over a network via or through the network interface unit. The term "machine-readable medium" may be construed to include a single medium and/or multiple media (e.g., a centralized and/or distributed database, and/or associated caches and servers) that store the one or more sets of instructions. Moreover, the term "machine-readable medium" may be construed to include any medium that is capable of storing, encoding and/or carrying a set of instructions that may be executed by a network device such that the execution of these instructions causes the network device to perform one or more of the methodologies of the various embodiments. Furthermore, the term "machine-readable medium" may be construed to include, but shall not be limited to, solid-state memories, optical and magnetic media, and carrier wave signals.

Figure 3A:
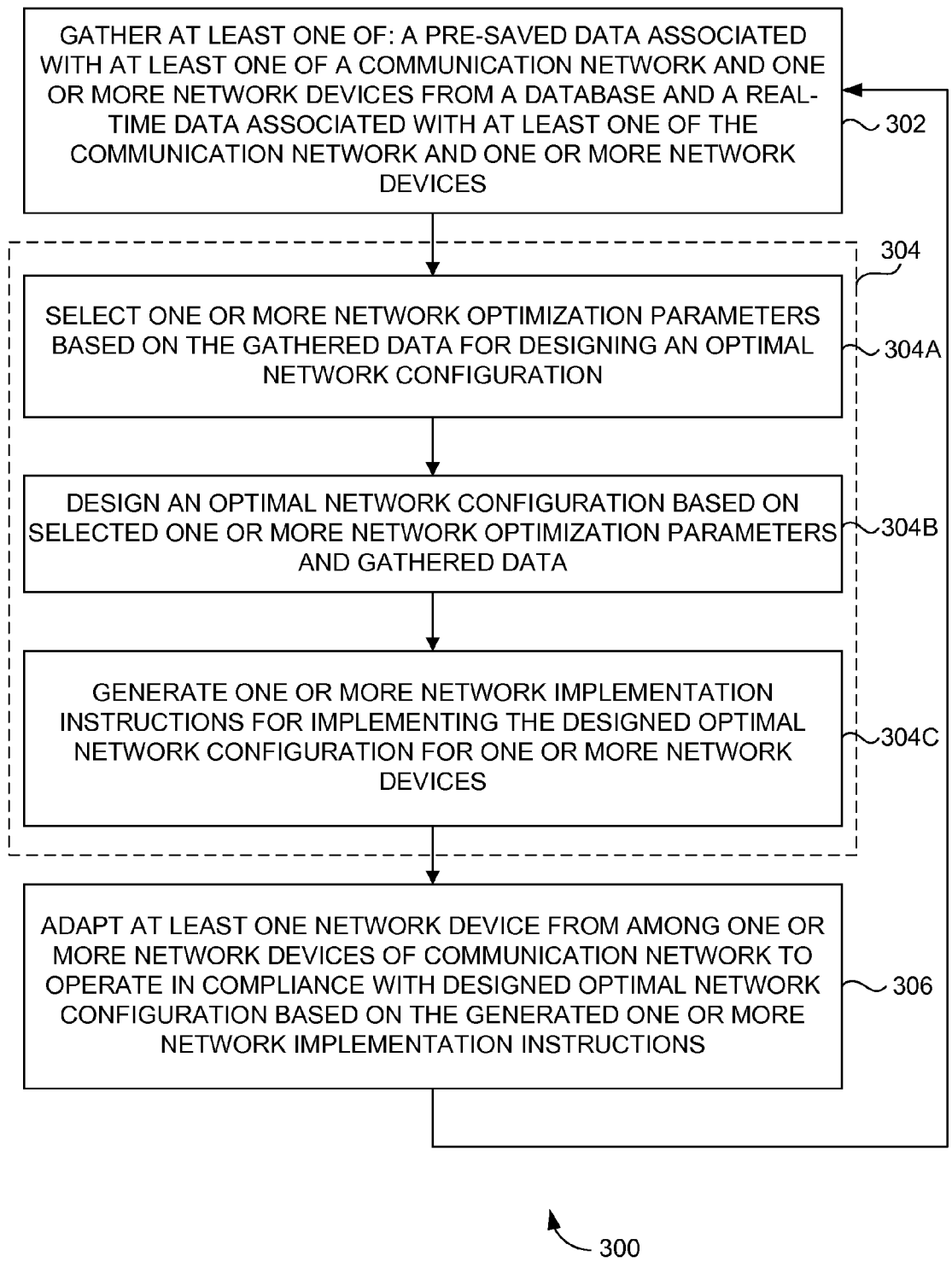
FIG. 3A is a process flow diagram depicting a method of dynamically designing and operating an optimal network configuration according to an embodiment herein.

FIG. 3A is a process flow diagram depicting a method 300 of dynamically designing and operating an optimal network configuration according to an embodiment herein. In an example, the method 300 may be performed in the network environment 100 described with reference to FIG. 1 by a network configuration system 202 as described herein with reference to FIG. 2. In operation 302, a pre-saved data associated with a communication network (such as communication network 106) and/or one or more network devices is gathered (by for example, the data sensing module 206 of FIG. 2) from a database and/or a real-time data associated with the communication network and/or one or more network devices is gathered (by for example, the data sensing module 206 of FIG. 2) from the communication network and/or the associated devices. In an embodiment, the real-time data may be gathered by sensing the communication network and/or one or more network devices (such as a BS or a user device of FIG. 1) associated with the communication network. In an embodiment, the real-time data may be gathered by sensing based on for example, e.g., a spectrum sensing. In an embodiment, the real-time data may be gathered by sensing the radio frequency environment and the network environment. In an embodiment, the real-time data may be gathered by listening to or by communicating over an initial-handshake channel with one or more user devices associated with the communication network. In an embodiment, the pre-saved data and/or the real-time data may include, for example a structured data and/or an unstructured data. The database includes for example, an organized database and an unorganized database. In an embodiment, the pre-saved data and/or real-time data may include, for example big data and the big data may be gathered by the network environment via big data analysis. In an embodiment, the pre-saved data may include cloud data gathered from a storage database based on cloud computing. Various examples of the real-time data and pre-saved data is as described along with FIG. 2.

At step 304, an optimal network configuration may be dynamically generated in one or more network devices (by using for example, network design module 208). At sub-step 304A of step 304 one or more network optimization parameters may be selected based on the gathered data for designing an optimal network configuration. In an embodiment, the network optimization parameters may be selected so as to be optimized relative to one or more other network optimization parameters. For example, the network optimization parameters may be selected with an aim to optimize one or more network optimization parameters while keeping a minimum or a maximum target value for one or more other network optimization parameters. The minimum or maximum target value is a "constraint" for optimization, for example target value of a network optimization parameter may include a bit error rate of $10e^{-4}$. So bits per hertz may be optimized while maintaining a maximum bit error rate of $10e^{-4}$. In an embodiment, the one or more network optimization parameters may include one or more performance parameters such as bit error rate, reliability (uptime/graceful degradation), throughput or data rate, latency, security, and other user defined criteria.

At sub-step 304B, an optimal network configuration may be designed (for example, using network design module 208) based on selected one or more network optimization parameters and the gathered data. In an embodiment, the network optimization may be performed using one or more rules of performance-of-operation of communication networks and by applying certain optimization techniques. In an embodiment, one or more of at least one radio frequency channel, at least one of a modulation scheme and a demodulation scheme, and/or a media access control (MAC) scheme may be selected based on the gathered data for enabling optimal network performance based on the selected one or more network optimization parameters.

At sub-step 304C, one or more network implementation instructions may be generated (for example, using network design module 208) for implementing the designed optimal network configuration for one or more network devices in the network environment (such as network environment 100 of FIG. 1). The network implementation instructions may include, but is not limited to one or more executable instructions (for example, a computer executable code), one or more configuration files, one or more files containing virtual machine primitives, one or more binary executable instructions and/or any combination thereof. In an embodiment, network implementation instructions may be generated (in for example server 110 of FIG. 1) for optimal network configuration for both a BS and a user device of the network environment. In another embodiment, the BS or the user device may generate the network implementation instructions for the BS and/or one or more user devices in the communication network.

In an embodiment, at sub-step 304C, upon one or more BSs and/or one or more user devices comprising a VM model supporting a set of primitives, network implementation instructions including configuration files or virtual machine primitives may be generated at server, or one or more BSs or one or more user devices. Upon the network implementation instructions including configuration files or virtual machine primitives being generated at one or more network devices, the configuration files or virtual machine primitives may be transmitted to one or more user devices that may be configured to generate one or more binary executable instructions from the configuration files or the virtual machine primitives. Similarly, upon the network implementation instructions including configuration files or virtual machine primitives being generated at one or more user devices, the one or more user devices may be configured to generate one or more binary executable instructions from the configuration files or the virtual machine primitives. In an ad-hoc network, the network implementation instructions including configuration files or virtual machine primitives being generated at user devices may be transmitted to one or more other user devices that may be configured to generate one or more binary executable instructions from the configuration files or the virtual machine primitives. In an embodiment, the configuration files or the virtual machine primitives may include, for example, an optimum parameters set, a device capability of one or more user devices and/or one or more BSs, or a run time specification, and the like. The optimum parameters set may be for example, derived during designing the optimal network configuration. In an embodiment, the optimum parameter set may be selected based on an optimized cost function resulting on variable set of parameters.

The device capability may provide one or more constraints on generating the network implementation instruction (for example, code) capable of being executed on a network device. In an embodiment, upon the network implementation instructions being generated by a BS for the user device, the BS may need to be aware of one or more device capabilities of the user device, such as for example, a processing power on the PHY/MAC, single/multi core processor, a memory configuration, and the like for generating the network implementation instruction. For example, if the network optimization parameters for a downlink includes a security information using a Kasumi encryption, a schedule for MAC-round robin, a frame structure for MAC, a TTI Duration of 5 ms, an acknowledgement at MAC, a handover capability, an inter-radio access technology (RAT) capability a user device may be configured to design an optimal network configuration for a received based on the above network optimization parameters.

In another embodiment, network implementation instructions including a PHY code for PHY configuration and/or MAC code for MAC configuration may be generated. The MAC code may be generated automatically based on one or more parameters associated with a MAC configuration and the PHY code may be automatically generated based on one or more PHY parameters. In an embodiment, the MAC code and the PHY code may be generated for all the user devices and all the BSs in the communication network.

At step 306, at least one network device of the communication network may be adapted to operate in compliance with the designed optimal network configuration based on the generated one or more network implementation instructions. In an embodiment, in order to adapt at least one network device of the communication network to operate in compliance with the designed optimal communication network configuration, the network implementation instructions is provided (by for example, adapt module 210) via the communication network from one or more network devices to one or more other network devices. In an embodiment, the network implementation instructions may be transmitted (for example, downloaded) via the communication network from one or more network devices to one or more other network devices. In an embodiment, one or more network implementation instructions may be transmitted from a server to a BS and subsequently from the BS to a user device, upon the network implementation instructions being generated in the server. For example, the network implementation instructions comprising for example, a BS code generated at the server may be transmitted from the server to the one or more BSs of the communication network.

Similarly, the network implementation instructions comprising for example, a user device code may be transmitted from one or more BSs to one or more user devices. In an embodiment, one or more network implementation instructions may be provided from the base station to one or more user devices, upon the network implementation instructions being generated at the base station. In an embodiment, the network implementation instructions transmitted to the one or more user devices may include a user device code component of the generated network implementation instructions.

In another embodiment, one or more network implementation instructions may be transmitted (by for example, the adapt module 210) from the one or more user devices to one or more other user devices of the communication network, upon the network implementation instruction/the optimal network configuration being generated in the one or more user devices in an ad-hoc network. The optimal network configuration may be implemented in the one or more network devices by executing the one or more network implementation instructions in the one or more network devices to which the network implementation instructions is transmitted to.

In an embodiment, the database may be updated (by for example, adapt module 210) with the gathered data and the optimal network configuration for subsequent use. In an embodiment, the steps 302, 304, and 306 are repeated upon a criterion being fulfilled, the criterion is being based on at least one of the steps a) and b). For example, the criterion may include, (a) time based/periodic update such as lapse of certain time from a previous update, (b) environmental changes, such as when certain sensed parameter changes beyond certain percentage from a previously observed value (For example, SNR of a radio channel), (c) performance change, such as when measured performance falls below certain percentage of a previously observed performance (For example, a channel throughput), and/or (d) any other user defined/administrator defined event. In an embodiment, the repetition is triggered upon or subsequent to criterion being fulfilled. For example, the optimal communication network configuration may be dynamically designed and operated after every 6 hours.

Figure 3B:
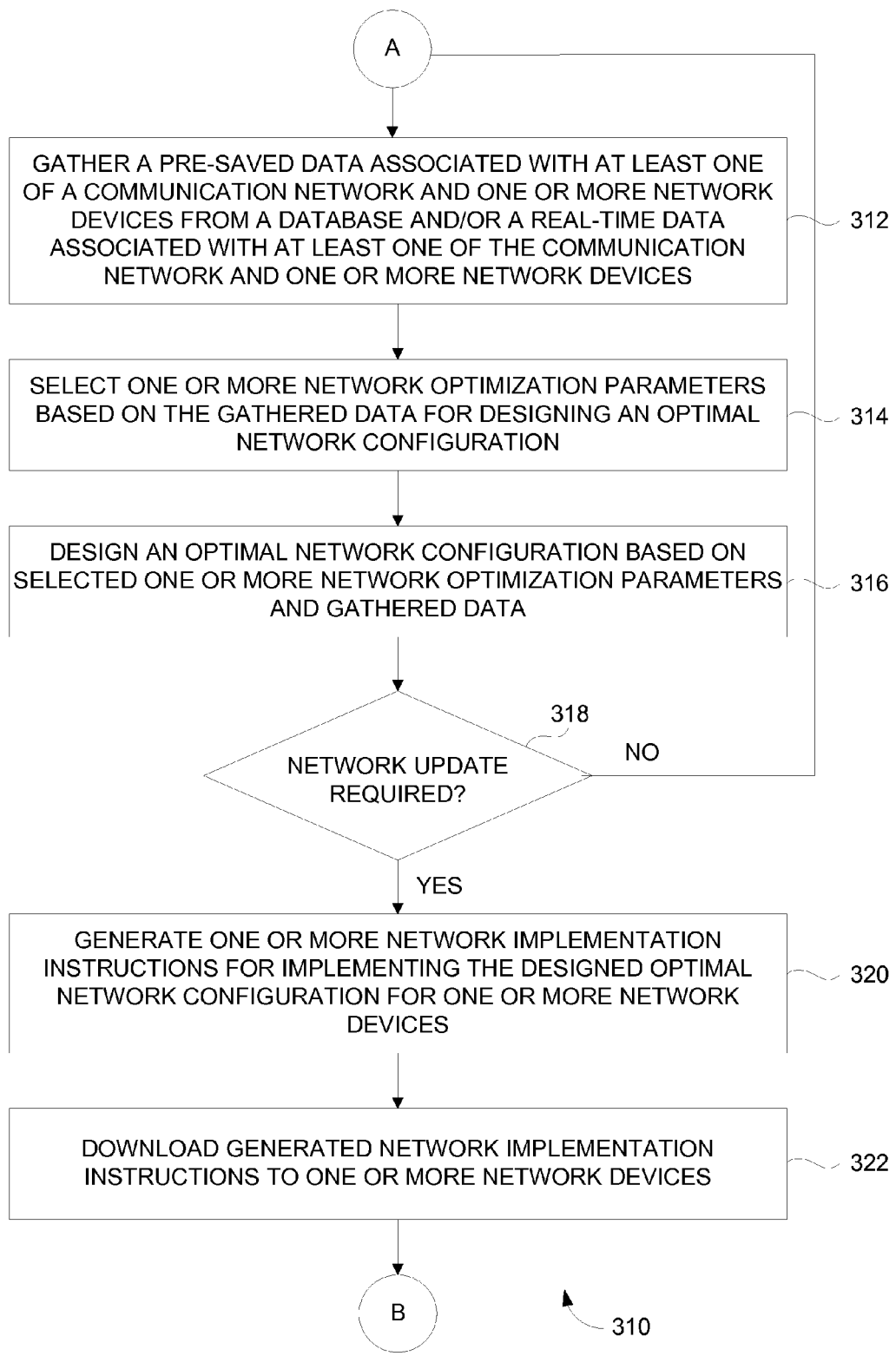
FIGS. 3B-3C depicts a flow chart illustrating the method illustrated in FIG. 3A, in accordance with an embodiment.
Figure 3C:
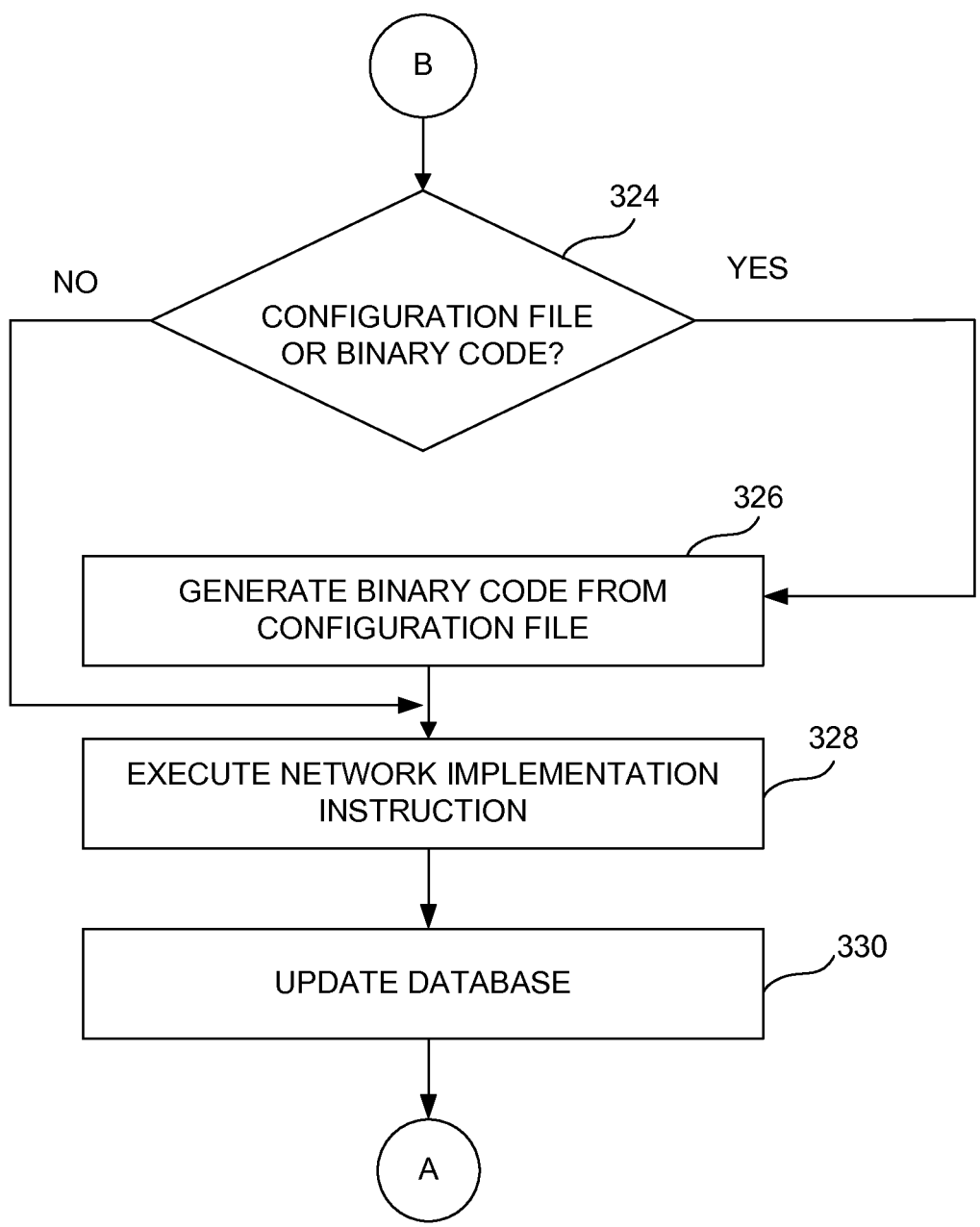

FIGS. 3B-3C depicts a flow chart 310 illustrating the method illustrated in FIG. 3A, in accordance with an embodiment. In step 312, a pre-saved data associated with a communication network (such as communication network 106) and/or one or more network devices is gathered (by for example, the data sensing module 206 of FIG. 2) from a database and/or a real-time data associated with the communication network and/or one or more network devices is gathered (by for example, the data sensing module 206 of FIG. 2) from the communication network and/or the associated devices. The step 312 is substantially similar to the step 302 of FIG. 3A. In an embodiment, in step 314, one or more network optimization parameters may be selected based on the gathered data for designing an optimal network configuration. In an embodiment, the network optimization parameters may be selected so as to be optimized relative to one or more other network optimization parameters. The step 314 is substantially similar to step 304A of FIG. 3A. In step 316, an optimal network configuration may be designed (for example, using network design module 208) based on selected one or more network optimization parameters and the gathered data. In an embodiment, the network optimization may be performed using one or more rules of performance-of-operation of communication networks and by applying certain optimization techniques. The step 316 is substantially similar to step 304B of FIG. 3A. In step 318, it is determined if a network update is required. If at step 318 it is determined that network update is required, then at 320 one or more network implementation instructions are generated. The step 320 is substantially similar to step 304C of FIG. 3A. At step 322 the generated network implementation instructions are downloaded to one or more network devices. The step 322 is substantially similar to the step of implementing the network implementation instructions as described along with FIG. 3A. Else, if at step 318 it is determined that network update is not required then step 312 is performed.

In step 324 it is determined if the downloaded network implementation instruction is a configuration file or a binary code. If the downloaded network implementation instruction is a configuration file, then step 326 is performed. At step 326 a binary code is generated from the downloaded configuration file. Else if at step 324 it is determined that the downloaded network implementation instruction is either a binary code, or is not a configuration file, then step 328 is performed. At step 328 the network implementation instructions are executed. At step 330, the database (e.g., database 204) is updated. After step 330, process 310 is repeated starting from step 312 onwards.

In step 318, a network update required is determined based on whether a criterion is fulfilled. The criterion may be based on at least one of operation of the data sensing module 206 and the network design module 208 as described along with FIG. 2. The criterion may include, for example, (a) time based/periodic update such as lapse of certain time from a previous update, (b) environmental changes, such as when certain sensed parameter changes beyond certain percentage from a previously observed value (For example, SNR of a radio channel), (c) performance change, such as when measured performance falls below certain percentage of a previously observed performance (For example, a channel throughput), and (d) any other user defined/administrator defined event. If at step 318 it is determined that network update is not required, then process 310 is repeated starting from step 312 onwards, either immediately or after certain delay depending on the data gathered in step 312. In an embodiment, the steps 324, 326 and 328 may be performed in a network device. In an embodiment, step 330 may be performed at a server or BS or a user device or a combination thereof.

Various embodiments of the present technology provide methods and systems for registering a user device (such as user devices 104A-N of FIG. 1) with a dynamically self-optimizing communication network and handing over the user device from one base station to another in the dynamically self-optimizing communication system. As used herein the term "dynamically self-optimizing communication network" refers to a system 200 (of FIG. 2) that includes a network configuration system 202 operable to dynamically design and operate an optimal communication network as described herein along with FIGS. 1-3C. In an embodiment, to enable a new user device to get registered on the dynamically self-optimizing communication network, a modulation sensing mechanism is used. The user device senses one or more radio waves transmitted by a base station in the dynamically self-optimizing communication network and tunes to the appropriate channel, modulation and establishes an initial hand-shake connection.

Figure 4:
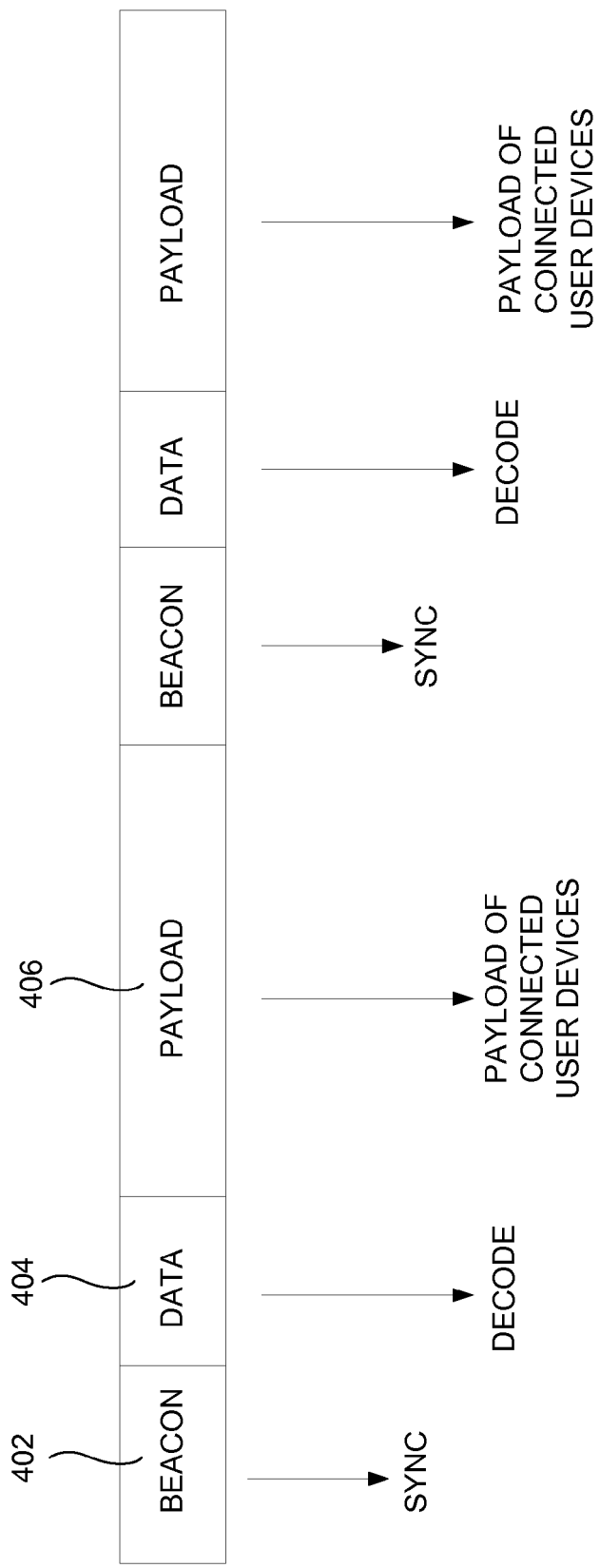
FIG. 4 exemplarily illustrates a base station downlink frame structure, in accordance with an embodiment.

FIG. 4. exemplarily illustrates a base station downlink frame structure, in accordance with an embodiment. The base station downlink frame structure includes a first part comprising of a beacon 402, a second part comprising data 404 and a third part comprising payload 406. The beacon 402 may be used for synchronization by one or more user devices. The data 404 provides useful information for the user device to be able downlink synchronize with the dynamically self-optimizing communication network. The downlink information in addition to providing preliminary data, such as modulation types, modulation parameters, may include one or more virtual machine primitives for user devices to be capable of generating code (executable instructions) to synchronize the user device with a base station with one or more base station modulation types. The payload 406 includes data payloads of the rest of the connected user devices in the dynamically self-optimizing communication network. In an embodiment, in order to establish a connection between a user device and a base station in the dynamically self-optimizing communication network disclosed herein, the user device may be modelled as a virtual machine. In an embodiment, the user device has a modulation sensing capability to sense a beacon of a plurality of radio access technology types such as 2G, 3G, 4G, or a base station defined modulation scheme.

The user device identifies a suitable channel and a modulation scheme for downlink aligning with the base station. The user device identifies the channel and the modulation scheme based on a dynamic selection or a static allocation. In an embodiment, the dynamic selection involves gathering, by the user device, a spectrum range from one of a user device memory or from an information provided by a subscriber identity module, scanning the spectrum to sense a beacon transmitted by the base station and deciphering the sensed beacon by the user device for identifying the channel and the modulation scheme. In an embodiment, static allocation involves identifying and selecting a pre-specified channel and a modulation mechanism by the user device over which the initial hand-shake is performed. The pre-specified channel and the modulation mechanism may be provided in a device memory or in a subscriber identity module. The pre-specified channel may be selected from plurality of channels. In an embodiment, a plurality of pre-specified channels may be sensed in a sequence or in a random order until successful selection of the pre-specified channel. The user device is configured to receive a set of virtual machine primitives from the base station (BS) for enabling the user device to register with the dynamically optimizing communication network.

The set of virtual machine primitives includes at least one of a modulation type and one or more modulation parameters to be used by the user device to communicate with the BS. The virtual machine primitives are generated for implementing the designed optimal network configuration for one or more user devices (as described herein with reference to FIGS. 2-3C). In an embodiment, the user device registers with the dynamically self-optimizing communication network based on the received set of virtual machine primitives. In an embodiment, while registering with the dynamically self-optimizing communication network, the user device generates one or more network implementation instructions based on the received set of virtual machine primitives, where the one or more network implementation instructions is executed on the user device for enabling a communication between the base station and the user device. The user device scans one or more carrier frequencies from the network to determine a suitable cell and a suitable base station associated with the suitable cell. Further, the user device receives broadcast information from the base station and the user device is downlink time synchronized based on the received broadcast information. The broadcast information provides the user device with relevant cell specific random access procedure information. Once the initial-hand shake for connection establishment of the user device with the base station is completed the process of the dynamic network optimization and update as explained herein with respect to FIGS. 3A-3C starts.

Figure 5:
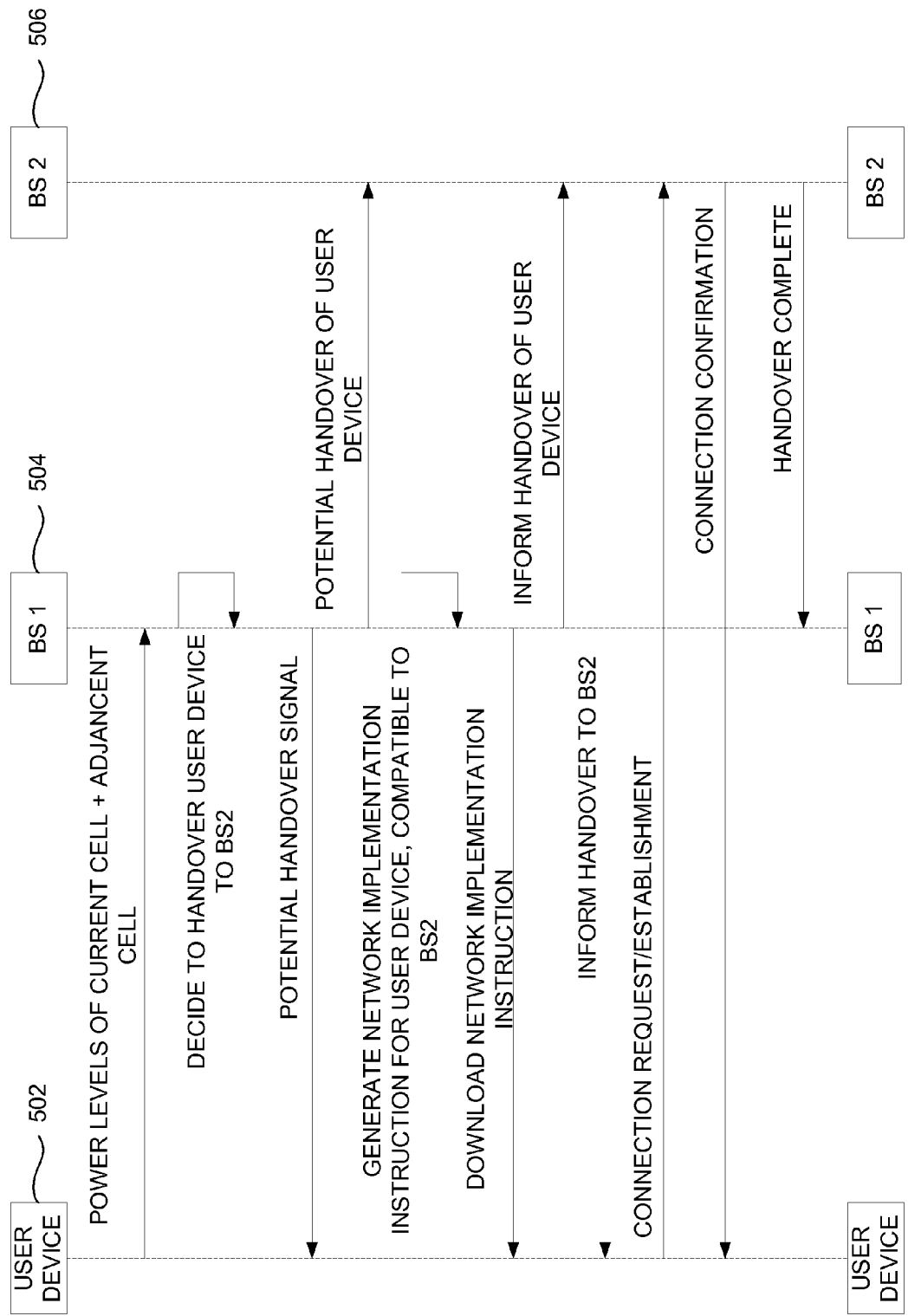
FIG. 5 depicts an interaction diagram illustrating a procedure for handing over a user device to a different base station in the dynamically self-optimizing communication network, in accordance with an embodiment.

In an embodiment, the user device (such as user device 104A-N of FIG. 1) may be handed over across diverse base stations. The base stations may be operating in PHY parameters set vastly different from that of one another base station. FIG. 5. depicts an interaction diagram illustrating a procedure for handing over a user device to a different base station in the dynamically self-optimizing communication network, in accordance with an embodiment. In an embodiment, the data sensing module 206 of FIG. 2 that may be associated with a first base station detects the need for a user device to be handed over to a second base station. This detection may be based on the sensed information provided by the user device, such as RF signal levels from different base stations in the vicinity. The second base station may support a different parameter set than what the first base station supports.

As depicted in FIG. 5, when the user device 502 is to be handed over from a first base station 504 to a second base station 506, then the first base station 504 may be configured to inform to the user device 502 and the second base station 506 about the handover. The sequence of lines starting from top to bottom indicate the sequence of events involved in the handover process. The first base station 504 generates a network implementation instruction for the user device 502 to adapt to the second base station 506. The first base station 504 downloads the generated network implementation instruction to the user device 502 and provides information to the user device 502 regarding when to start executing the network implementation instruction. Further the first base station 504 communicates to the second base station 506, an intimation regarding completion of handover of the user device 502 and informs the second base station 506 as to when to take over the user device 502. The user device 502 transmits a connection request to the second BS 506. The second base station 506 transmits the connection confirmation to the user device 502 for completing the handover. The user device 502 receives a connection confirmation from the second base station 506 and completing the handover. After the handover is complete, the user device 502 and the second base station 506 may begin interacting with compatible radio access technologies.

Figure 6:
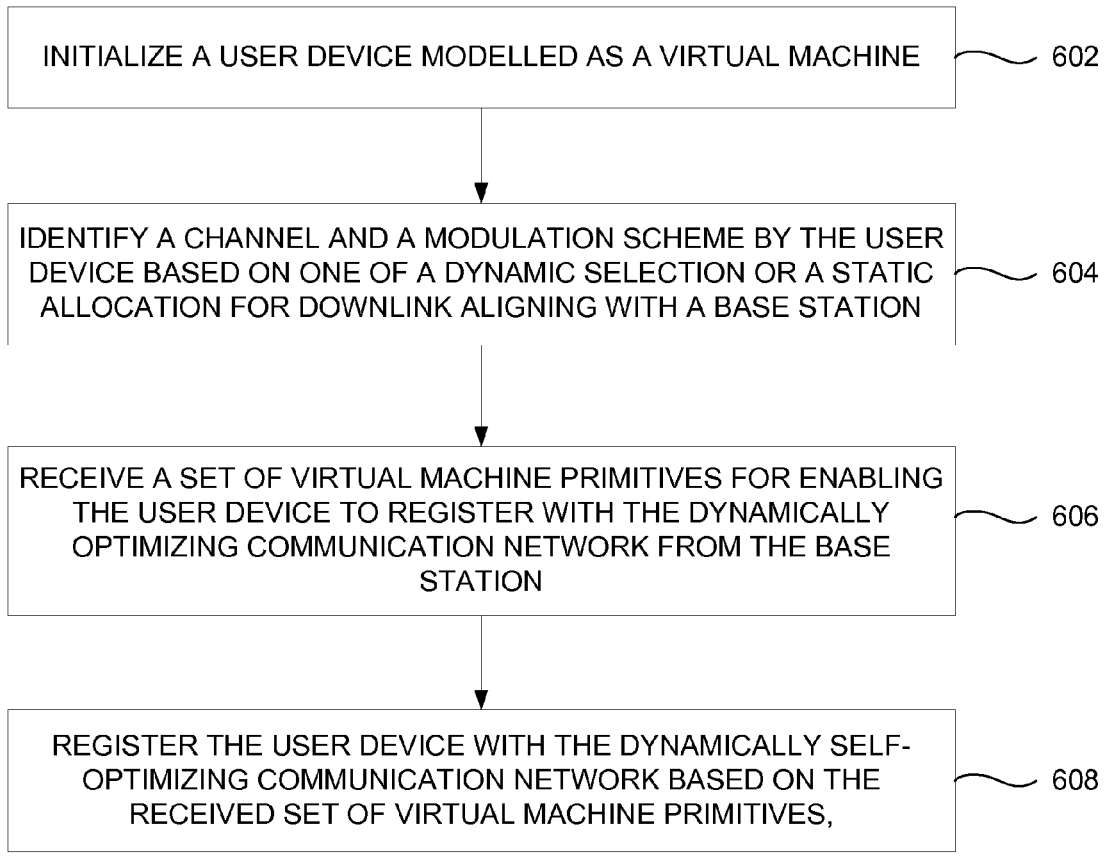
FIG. 6 is a flow diagram illustrating a process of registering a user device with a base station of a dynamically self-optimizing communication network, in accordance with an embodiment.

FIG. 6 is a flow diagram illustrating a process of registering a user device with a base station of a dynamically self-optimizing communication network, in accordance with an embodiment. In an embodiment, the user device may be modelled as a virtual machine. In an embodiment, the user device has a modulation sensing capability to sense a beacon of a plurality of radio access technology types such as 2G, 3G, 4G, or a base station defined modulation scheme. At step 602, the user device initializes. At step 604, the user device identifies a suitable channel and a modulation scheme for downlink aligning with the base station. The user device identifies the channel and the modulation scheme based on a dynamic selection or a static allocation. In an embodiment, the dynamic selection involves reading a spectrum range provided by a subscriber identity module information by the user device, scanning the spectrum to sense a beacon transmitted by the base station and deciphering the sensed beacon by the user device for identifying the channel in one or more designated channels specified by a service provider and the modulation scheme. In an embodiment, static allocation involves identifying and selecting a pre-specified channel and modulation mechanism by the user device over which the initial hand-shake is performed. The pre-specified channel may be selected from plurality of channels. The pre-specified channel and the modulation mechanism may be provided in a device memory or in a subscriber identity module. In an embodiment, a plurality of pre-specified channels may be sensed in a sequence or in a random order until successful selection of the pre-specified channel.

At step 606, the user device receives a set of virtual machine primitives from the base station for enabling the user device to register with the dynamically optimizing communication network. The set of virtual machine primitives includes at least one of a modulation type and one or more modulation parameters to be used by the user device to communicate with the BS. The virtual machine primitives are generated for implementing the designed optimal network configuration for one or more user devices (as described herein with reference to FIGS. 2-3C). At step 608, the user device registers with the dynamically self-optimizing communication network based on the received set of virtual machine primitives. In an embodiment, while registering with the dynamically self-optimizing communication network, the user device generates one or more network implementation instructions based on the received set of virtual machine primitives, where the one or more network implementation instructions is executed on the user device for enabling a communication between the base station and the user device. The user device scans one or more carrier frequencies from the network to determine a suitable cell and a suitable base station associated with the suitable cell. Further, the user device receives a broadcast information from the base station and the user device is downlink time synchronized based on the received broadcast information. The broadcast information provides the user device with relevant cell specific random access procedure information. Once the initial-hand shake for connection establishment of the user device with the base station is completed the process of the dynamic network optimization and update as explained herein with respect to FIGS. 3A-3C starts.

Figure 7:
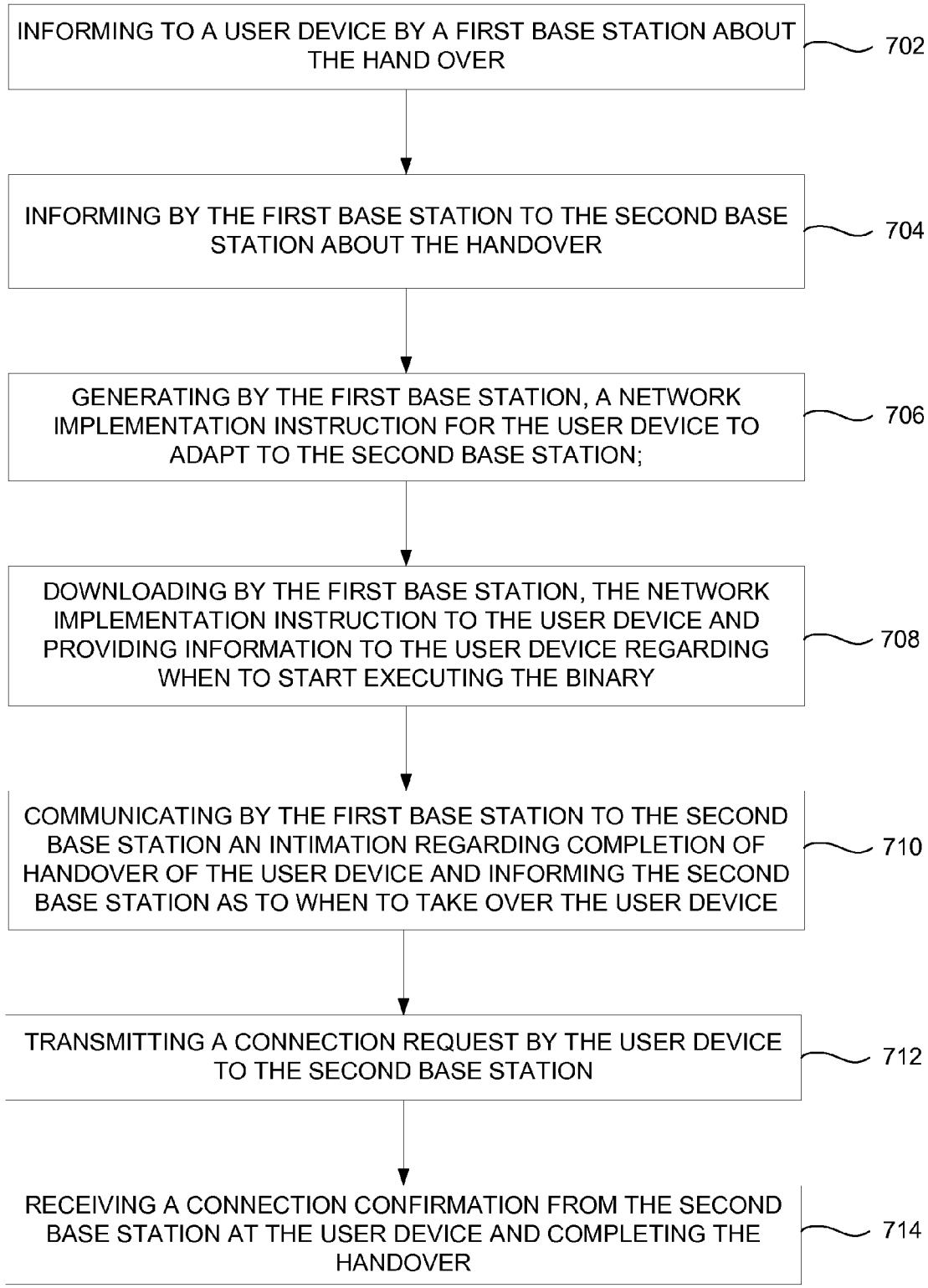
FIG. 7 is a flow diagram illustrating a process of handing over the user device registered with a base station to a different base station in the dynamically self-optimizing communication network, in accordance with an embodiment.

FIG. 7 is a flow diagram illustrating a process of handing over the user device registered with a base station to a different base station in the dynamically self-optimizing communication network, in accordance with an embodiment. The two base stations may be operating in PHY parameters set vastly different from that of one another. In an embodiment, the data sensing module 206 of FIG. 2 that may be associated with a first base station detects the need for a user device to be handed over to a second base station. This detection may be based on the sensed information provided by the user device, such as RF signal levels from different base stations in the vicinity. The second base station may support a different parameter set than what the first base station supports. When the user device is to be handed over from a first base station to a second base station, then the first base station may be configured to inform to the user device of the handover at step 702. At step 704, the first base station may inform to the second base station about the hand over. At step 706, the first base station generates a network implementation instruction for the user device to adapt to the second base station. At step 708, the first base station downloads the generated network implementation instruction to the user device and provides information to the user device regarding when to start executing the network implementation instruction. At step 710, the the first base station communicates to the second base station, an intimation regarding completion of handover of the user device and informs the second base station as to when to take over the user device. At step 712, the user device transmits a connection request to the second base station. The second base station transmits the connection confirmation to the user device for completing the handover. At step 714, the user device receives a connection confirmation from the second base station 506 and completing the handover. After the handover is complete, the user device and the second base station may begin interacting with compatible radio access technologies.

Figure 8:
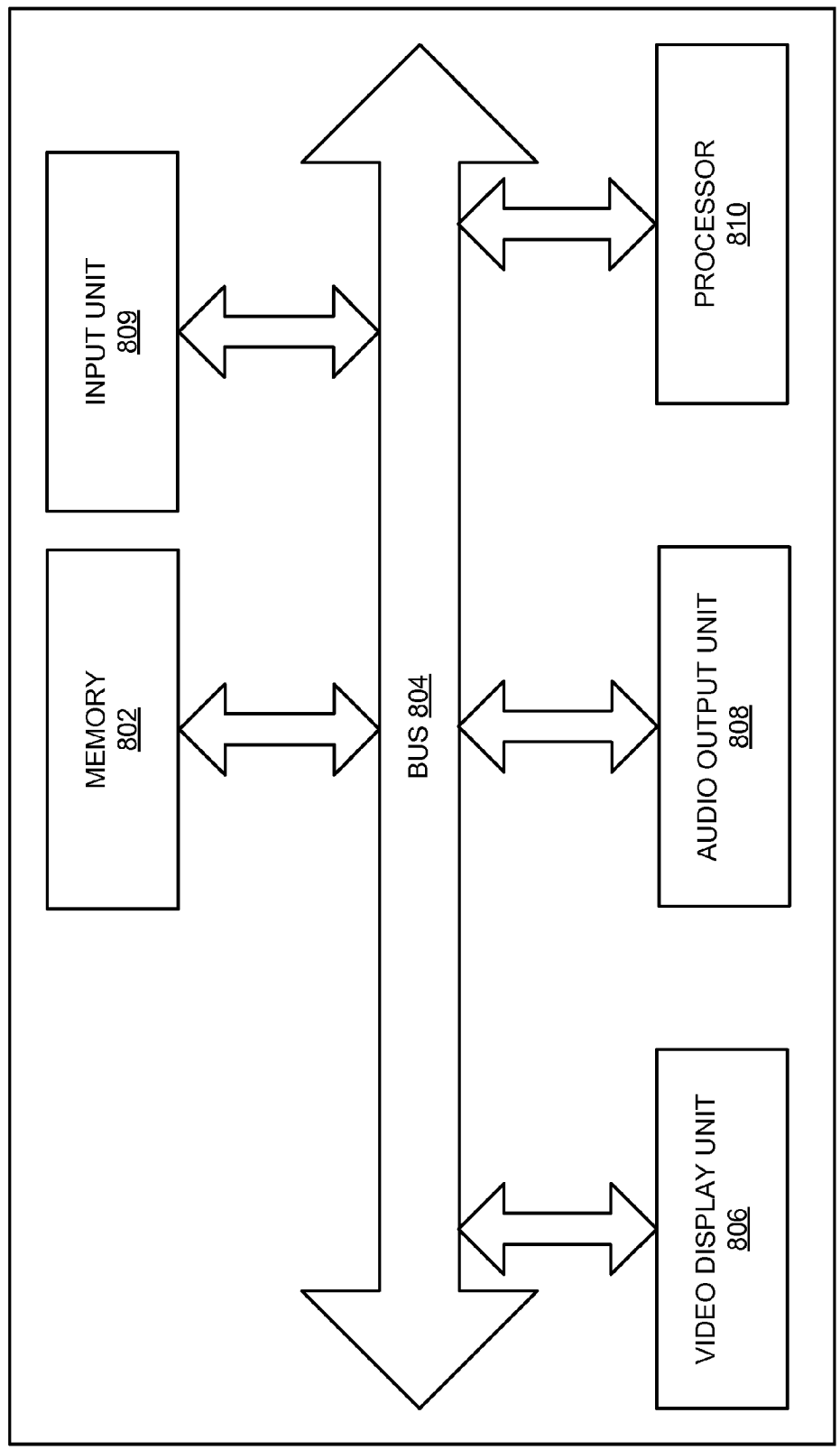
FIG. 8 illustrates an exploded view of the user device to perform any one or more of the methodologies herein, in accordance with an embodiment.

FIG. 8 illustrates an exploded view of the user device having a memory 802 storing a set of computer instructions, a bus 804, a video display unit 806, an audio output unit 808, an input unit 809, and a processor 810 capable of processing a set of instructions to perform any one or more of the methodologies herein, according to an embodiment herein. The processor 810 may enable digital content to be consumed in the form of video for output via the video display unit 806 or audio for output via the audio output unit 808.

An example of the audio output unit 808 may include a speaker. An example of the input unit 809 may include, but is not limited to a microphone, a keyboard, a haptic input device, a camera, and the like. The processor 810 may also carry out the methods described herein and in accordance with the embodiments herein.

Digital content may also be stored in the memory 802 for future processing or consumption. The memory 802 may also store program specific information and/or service information (PSI/SI), including information about digital content (e.g., the detected information bits) available in the future or stored from the past. A user (for example user 102 of the one or more user devices 104A-N) may view the stored information on the display 806 and select an item of for viewing, listening, or other uses via input, which may take the form of keypad, scroll, or other input device(s) or combinations thereof. When digital content is selected, the processor 810 may pass information. The content and PSI/SI may be passed among functions within the user devices using the bus 804.

The techniques provided by the embodiments herein may be implemented on an integrated circuit chip (not shown). The chip design is created in a graphical computer programming language, and stored in a computer storage medium (such as a disk, tape, physical hard drive, or virtual hard drive such as in a storage access network). If the designer does not fabricate chips or the photolithographic masks used to fabricate chips, the designer transmits the resulting design by physical means (e.g., by providing a copy of the storage medium storing the design) or electronically (e.g., through the Internet) to such entities, directly or indirectly.

The stored design is then converted into the appropriate format (e.g., GDSII) for the fabrication of photolithographic masks, which typically include multiple copies of the chip design in question that are to be formed on a wafer. The photolithographic masks are utilized to define areas of the wafer (and/or the layers thereon) to be etched or otherwise processed. The resulting integrated circuit chips can be distributed by the fabricator in raw wafer form (that is, as a single wafer that has multiple unpackaged chips), as a bare die, or in a packaged form. In the latter case the chip is mounted in a single chip package (such as a plastic carrier, with leads that are affixed to a motherboard or other higher level carrier) or in a multichip package (such as a ceramic carrier that has either or both surface interconnections or buried interconnections). In any case the chip is then integrated with other chips, discrete circuit elements, and/or other signal processing devices as part of either (a) an intermediate product, such as a motherboard, or (b) an end product. The end product can be any product that includes integrated circuit chips, ranging from toys and other low-end applications to advanced computer products having a display, a keyboard or other input device, and a central processor.

The embodiments herein can take the form of, an entirely hardware embodiment, an entirely software embodiment or an embodiment including both hardware and software elements. The embodiments that are implemented in software include but are not limited to, firmware, resident software, microcode, etc. Furthermore, the embodiments herein can take the form of a computer program product accessible from a computer-usable or computer-readable medium providing program code for use by or in connection with a computer or any instruction execution system. For the purposes of this description, a computer-usable or computer readable medium can be any apparatus that can comprise, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk—read only memory (CD-ROM), compact disk—read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, Subscriber Identity Module (SIM) card, and cache memories which provide temporary storage of at least some program code in order to reduce the number of times code must be retrieved from bulk storage during execution. Input/output (I/O) devices (including but not limited to keyboards, displays, pointing devices, remote controls, camera, microphone, temperature sensor, accelerometer, gyroscope, etc.) can be coupled to the system either directly or through intervening I/O controllers. Network adapters may also be coupled to the system to enable the data processing system to become coupled to other data processing systems or remote printers or storage devices through intervening private or public networks. Modems, cable modem and Ethernet cards are just a few of the currently available types of network adapters.

FIG. 9 depicts a functional block diagram of an example general-purpose digital computing environment 900 that may be used to implement various aspects of the present technology disclosed herein (such as for example, a user device, a base station or system 200). The general purpose digital computing environment of FIG. 9 includes a processor 902, a main memory 904, a static memory 906, a bus 908, a video display 910, an alpha-numeric input device 912, a cursor control device 914, a drive unit 916, a signal generation device 918, a network interface device 920, a machine readable medium 922, instructions 924, and a network 926, according to one embodiment.

The processor 902 may be include, but is not limited to a microprocessor, a state machine, an application specific integrated circuit, a field programmable gate array, etc. (e.g., an Intel® Pentium® processor). The main memory 904 may be a dynamic random access memory and/or a primary memory of a computer system. The static memory 906 may include for example a hard disk drive for reading from and writing to a hard disk (not shown), a magnetic disk drive for reading from or writing to a removable magnetic disk, or an optical disk drive for reading from or writing to a removable optical disk such as a CD ROM or other optical media. The drives and their associated computer-readable media provide nonvolatile storage of computer readable instructions, data structures, program modules and other data for a computer. It will be appreciated by those skilled in the art that other types of computer readable media that can store data that is accessible by a computer, such as magnetic cassettes, flash memory cards, digital video disks, Bernoulli cartridges, RAMs, ROMs, and the like, may also be used in the example general purpose computing environment 500.

The bus 908 may be an interconnection between various circuits and/or structures of the purpose computing environment 900. The video display 910 may provide a graphical representation of information on the data processing system. The alpha-numeric input device 912 may be a keypad, a keyboard and/or any other input device of text (e.g., a special device to aid the physically handicapped), a microphone, joystick, game pad, satellite dish, scanner or the like. The alpha-numeric input device 912 is often connected to the processing unit through a serial port interface that is coupled to the system bus, but may be connected by other interfaces, such as a parallel port, game port or a universal serial bus (USB).

The cursor control device 914 may be a pointing device such as a mouse. The drive unit 916 may be the hard drive, a storage system, and/or other longer term storage subsystem. The signal generation device 918 may be a bios and/or a functional operating system of the data processing system. The network interface device 920 may be a device that performs interface functions such as code conversion, protocol conversion and/or buffering required for communication to and from the network 926. The machine readable medium 922 may provide instructions on which any of the methods disclosed herein may be performed. The instructions 924 may provide source code and/or data code to the processor 902 to enable any one or more operations disclosed herein.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the appended claims.

What is claimed is:

1. A method of establishing a connection between a user device and a base station in a dynamically self-optimizing communication network, said method comprising steps of:
    initializing said user device, wherein said user device is modelled as a virtual machine;
    identifying a channel and a modulation scheme by said user device based on one of a dynamic selection or a static allocation for downlink aligning with said base station;
    receiving a set of virtual machine primitives for enabling said user device to register with said dynamically optimizing communication network from said base station, wherein said set of virtual machine primitives comprises at least one of a modulation type and one or more modulation parameters to be used by said user device to communicate with said base station; and
    registering by said user device with said dynamically self-optimizing communication network based on said received set of virtual machine primitives, wherein said dynamically self-optimizing communication network comprises a communication network configuration system configured to:
        dynamically generate an optimal network configuration in one or more base stations by:
            selecting one or more network optimization parameters based on a data comprising at least one of a pre-existing data or a real-time data associated with at least one of said communication network and one or more user devices data for designing an optimal network configuration;
            designing said optimal network configuration based on selected one or more network optimization parameters and said data; and
            generating one or more virtual machine primitives for implementing said designed optimal network configuration for said one or more user devices; and
        adapt at least one network device of said self-optimizing communication network to operate in compliance with said designed optimal network configuration based on said generated one or more virtual machine primitives.

2. The method of claim 1, wherein said registering comprises:
    generating said one or more network implementation instructions by said user device based on said received set of virtual machine primitives, wherein said one or more network implementation instructions is executed on said user device for enabling a communication between said base station and said user device;
    scanning one or more carrier frequencies by said user device from said network to determine a suitable cell and a suitable base station associated with said suitable cell;
    receiving a broadcast information from said base station, wherein said broadcast information provides said user device with relevant cell specific random access procedure information; and
    downlink time synchronizing said user device based on said received broadcast information.

3. The method of claim 1, wherein said user device comprises modulation sensing capability to sense said beacon of a plurality of radio access technology types, wherein said plurality of radio access technology types selected from at least one of 2G, 3G, 4G, or a base station defined modulation scheme.

4. The method of claim 1, wherein identifying said channel and said modulation scheme by said user device based on said dynamic selection comprises:
    gathering by said user device a spectrum range from one of a user device memory or an information provided by a subscriber identity module;
    scanning said spectrum to sense a beacon transmitted by said base station in said dynamically self-optimizing communication network; and
    deciphering said sensed beacon by said user device for identifying said channel and said modulation scheme.

5. The method of claim 1, wherein identifying said channel and said modulation scheme by said user device based on said static allocation comprises:
    identifying and selecting a pre-specified channel and a modulation mechanism by said user device over which said initial hand-shake is performed, wherein said pre-specified channel is selected from plurality of channels, wherein said pre-specified channel and said modulation mechanism are provided in a device memory or in a subscriber identity module, wherein said plurality of pre-specified channels are sensed in a sequence or in a random order until successful selection of said pre-specified channel.

6. The method of claim 1, further comprising handover of a user device from a first base station to a second base station in a dynamically self-optimizing communication network comprising:
   informing to said user device by said first base station about said hand over;
   informing by said first base station to said second base station about said handover;
   generating by said first base station, a network implementation instruction for said user device to adapt to said second base station;
   downloading by said first base station, said network implementation instruction to said user device and providing information to said user device regarding when to start executing said network implementation instruction;
   communicating by said first base station to said second base station an intimation regarding completion of handover of said user device and informing said second base station as to when to take over said user device; and
   transmitting a connection request by said user device to said second base station; and
   receiving a connection confirmation from said second base station at said user device and completing said handover.

7. A method of handover of a user device from a first base station to a second base station in a dynamically self-optimizing communication network, said method comprising:
   informing to said user device by said first base station about said hand over;
   informing by said first base station to said second base station about said handover;
   generating by said first base station, a network implementation instruction for said user device to adapt to said second base station;
   downloading by said first base station, said network implementation instruction to said user device and providing information to said user device regarding when to start executing said network implementation instruction;
   communicating by said first base station to said second base station an intimation regarding completion of handover of said user device and informing said second base station as to when to take over said user device;
   transmitting a connection request by said user device to said second base station; and
   receiving a connection confirmation from said second base station at said user device and completing said handover, wherein said dynamically self-optimizing communication network comprises a communication network configuration system configured to:
      dynamically generate an optimal network configuration in one or more base stations by:
         selecting one or more network optimization parameters based on a data comprising at least one of a pre-existing data or a real-time data associated with at least one of said communication network and one or more user devices data for designing an optimal network configuration;
         designing said optimal network configuration based on selected one or more network optimization parameters and said data; and
         generating one or more virtual machine primitives for implementing said designed optimal network configuration for said one or more user devices; and
      adapt at least one network device of said self-optimizing communication network to operate in compliance with said designed optimal network configuration based on said generated one or more virtual machine primitives.

8. A user device modelled as a virtual machine, said user device configured to establish a connection with a base station in a dynamically self-optimizing communication network by:
   initializing and identifying a channel and a modulation scheme based on one of a dynamic selection or a static allocation for downlink aligning with said base station of said dynamically self-optimizing communication network;
   receiving a set of virtual machine primitives from said base station to register with said dynamically optimizing communication network, wherein said set of virtual machine primitives comprises at least one of a modulation type and one or more modulation parameters to be used by said user device to communicate with said base station; and
   registering with said dynamically self-optimizing communication network based on said received set of virtual machine primitives, wherein said dynamically self-optimizing communication network comprises a communication network configuration system configured to:
      dynamically generate an optimal network configuration in one or more base stations by:
         selecting one or more network optimization parameters based on a data comprising at least one of a pre-existing data or a real-time data associated with at least one of said communication network and one or more user devices data for designing an optimal network configuration;
         designing said optimal network configuration based on selected one or more network optimization parameters and said data; and
         generating one or more virtual machine primitives for implementing said designed optimal network configuration for said one or more user devices; and
      adapt at least one network device of said self-optimizing communication network to operate in compliance with said designed optimal network configuration based on said generated one or more virtual machine primitives.

9. The user device of claim 8, further configured to perform during said registering, steps comprising:
   generating said one or more network implementation instructions based on said received set of primitives, wherein said one or more network implementation instructions is executed on said user device for enabling a communication between said base station and said user device;
   scanning one or more carrier frequencies from said network to determine a suitable cell and a suitable base station associated with said suitable cell;
   receiving a broadcast information from said base station, wherein said broadcast information provides said user device with relevant cell specific random access procedure information; and
   downlink time synchronizing based on said received broadcast information.

10. The user device of claim 8, comprising modulation sensing capability to sense said beacon of a plurality of radio access technology types, wherein said plurality of radio access technology types selected from at least one of 2G, 3G, 4G, or a base station defined modulation scheme.

11. The user device of claim 8, further configured to:
gather a spectrum range from one of user device memory or from an information provided by a subscriber identity module;
scan said spectrum to sense a beacon transmitted by said base station in said dynamically self-optimizing communication network; and
decipher said sensed beacon for identifying said channel in one or more designated channels specified by a service provider and said modulation scheme.

12. The user device of claim 8, configured to perform, during said identifying said channel and said modulation scheme based on said static allocation:
identifying and selecting a pre-specified channel and a modulation mechanism over which said initial handshake is performed, wherein said pre-specified channel and said modulation mechanism are provided in a device memory or in a subscriber identity module, wherein said pre-specified channel is selected from plurality of channels, and wherein said plurality of pre-specified channels are sensed in a sequence or in a random order until successful selection of said pre-specified channel.

13. A system in a dynamically self-optimizing communication network, for handover of a user device from a first base station to a second base station, said system comprising:
a first base station configured to:
inform to said user device about said hand over;
inform to said second base station about said handover;
generate a network implementation instruction for said user device to adapt to said second base station;
download said network implementation instruction to said user device and provide information to said user device regarding when to start executing said network implementation instruction;
communicate to said second base station an intimation regarding completion of handover of said user device and informing said second base station as to when to take over said user device;
said user device configured to:
transmit a connection request to said second base station; and
receive a connection confirmation from said second base station and completing said handover; and
said second base station configured to transmit said connection confirmation to said user device for completing said handover;
wherein said dynamically self-optimizing communication network comprises a communication network configuration system configured to:
dynamically generate an optimal network configuration in one or more base stations by: selecting one or more network optimization parameters based on a data comprising at least one of a pre-existing data or a real-time data associated with at least one of said communication network and one or more user devices data for designing an optimal network configuration; designing said optimal network configuration based on selected one or more network optimization parameters and said data; and generating one or more virtual machine primitives for implementing said designed optimal network configuration for said one or more user devices; and
adapt at least one network device of said self-optimizing communication network to operate in compliance with said designed optimal network configuration based on said generated one or more virtual machine primitives.

14. A non-transitory machine-readable medium carrying one or more sequences of instructions which, when executed by one or more processors, cause the one or more processors to execute a method of establishing a connection between a user device and a base station in a dynamically self-optimizing communication network, said method comprising steps of:
initializing said user device, wherein said user device is modelled as a virtual machine;
identifying a channel and a modulation scheme by said user device based on one of a dynamic selection or a static allocation for downlink aligning with said base station;
receiving a set of virtual machine primitives for enabling said user device to register with said dynamically optimizing communication network from said base station, wherein said set of virtual machine primitives comprises at least one of a modulation type and one or more modulation parameters to be used by said user device to communicate with said base station; and
registering by said user device with said dynamically self-optimizing communication network based on said received set of virtual machine primitives, wherein said dynamically self-optimizing communication network comprises a communication network configuration system configured to:
dynamically generate an optimal network configuration in one or more base stations by:
selecting one or more network optimization parameters based on a data comprising at least one of a pre-existing data or a real-time data associated with at least one of said communication network and one or more user devices data for designing an optimal network configuration;
designing said optimal network configuration based on selected one or more network optimization parameters and said data; and
generating one or more virtual machine primitives for implementing said designed optimal network configuration for said one or more user devices; and
adapt at least one network device of said self-optimizing communication network to operate in compliance with said designed optimal network configuration based on said generated one or more virtual machine primitives.

15. The non-transitory machine-readable medium of claim 14, wherein said registering comprises:
generating said one or more network implementation instructions by said user device based on said received set of virtual machine primitives, wherein said one or more network implementation instructions is executed on said user device for enabling a communication between said base station and said user device;
scanning one or more carrier frequencies by said user device from said network to determine a suitable cell and a suitable base station associated with said suitable cell;

receiving a broadcast information from said base station, wherein said broadcast information provides said user device with relevant cell specific random access procedure information; and downlink time synchronizing said user device based on said received broadcast information.

16. The non-transitory machine-readable medium of claim 14, wherein identifying said channel and said modulation scheme by said user device based on said dynamic selection comprises:

gathering by said user device a spectrum range from one of a user device memory or from an information provided by a subscriber identity module;

scanning said spectrum to sense a beacon transmitted by said base station in said dynamically self-optimizing communication network; and deciphering said sensed beacon by said user device for identifying said channel in one or more designated channels specified by a service provider and said modulation scheme.

17. The non-transitory machine-readable medium of claim 14, wherein identifying said channel and said modulation scheme by said user device based on said static allocation comprises:

identifying and selecting a pre-specified channel and a modulation mechanism by said user device over which said initial hand-shake is performed, wherein said pre-specified channel and said modulation mechanism are provided in a device memory or in a subscriber identity module, wherein said pre-specified channel is selected from plurality of channels, wherein said plurality of pre-specified channels are sensed in a sequence or in a random order until successful selection of said pre-specified channel.

18. A non-transitory machine-readable medium carrying one or more sequences of instructions which, when executed by one or more processors, cause the one or more processors to execute a method of handover of a user device from a first base station to a second base station in a dynamically self-optimizing communication network, said method comprising steps of:

informing to said user device by said first base station about said handover;

informing by said first base station to said second base station about said handover;

generating by said first base station, a network implementation instruction for said user device to adapt to said second base station;

downloading by said first base station, said network implementation instruction to said user device and providing information to said user device regarding when to start executing said network implementation instruction;

communicating by said first base station to said second base station an intimation regarding completion of handover of said user device and informing said second base station as to when to take over said user device;

transmitting a connection request by said user device to said second base station; and receiving a connection confirmation from said second base station at said user device and completing said handover, wherein said dynamically self-optimizing communication network comprises a communication network configuration system configured to:

dynamically generate an optimal network configuration in one or more base stations by: selecting one or more network optimization parameters based on a data comprising at least one of a pre-existing data or a real-time data associated with at least one of said communication network and one or more user devices data for designing an optimal network configuration; designing said optimal network configuration based on selected one or more network optimization parameters and said data; and generating one or more virtual machine primitives for implementing said designed optimal network configuration for said one or more user devices; and adapt at least one network device of said self-optimizing communication network to operate in compliance with said designed optimal network configuration based on said generated one or more virtual machine primitives.

* * * * *